(12) United States Patent
Hanafusa et al.

(10) Patent No.: US 11,897,020 B2
(45) Date of Patent: Feb. 13, 2024

(54) RECIPROCATING LINEAR MOTION MECHANISM FOR CAN BODY MAKER AND CAN BODY MAKER

(71) Applicants: Universal Can Corporation, Tokyo (JP); G&P Inc., Tokyo (JP)

(72) Inventors: Tatsuya Hanafusa, Tokyo (JP); Naoyuki Yaguchi, Makinohara (JP); Hideyuki Hiramatsu, Kikugawa (JP)

(73) Assignees: Universal Can Corporation, Tokyo (JP); G&PInc., Tokyo (JP)

( * ) Notice: Subject to any disclaimer, the term of this patent is extended or adjusted under 35 U.S.C. 154(b) by 275 days.

(21) Appl. No.: 17/215,775

(22) Filed: Mar. 29, 2021

(65) Prior Publication Data

US 2022/0016688 A1  Jan. 20, 2022

(30) Foreign Application Priority Data

Jul. 20, 2020 (JP) ................. 2020-123740
Jul. 20, 2020 (JP) ................. 2020-123741
Jul. 20, 2020 (JP) ................. 2020-123744

(51) Int. Cl.
*B21D 51/26* (2006.01)

(52) U.S. Cl.
CPC .................. *B21D 51/26* (2013.01)

(58) Field of Classification Search
CPC ......... B21D 22/28; B21D 22/30; B21D 51/26
See application file for complete search history.

(56) References Cited

U.S. PATENT DOCUMENTS 5,400,635 A * 3/1995 Kawaguchi ............ B21D 45/06
72/349
7,882,721 B2   2/2011 Gombas

FOREIGN PATENT DOCUMENTS

| EP | 0437305 A1 | 7/1991 |
| EP | 0589203 A2 | 3/1994 |
| JP | 2018-054065 A | 4/2018 |

OTHER PUBLICATIONS

European Search Report dated Dec. 13, 2021 for the corresponding European Patent Application No. 21184736.3.

* cited by examiner

*Primary Examiner* — Debra M Sullivan
(74) *Attorney, Agent, or Firm* — Leason Ellis LLP; Melvin C. Garner; Mitsuhiro Haraguchi

(57) ABSTRACT

A reciprocating linear motion mechanism for a can body maker includes: a housing including an internal gear; a first rotation body; a first bearing connecting the housing and the first rotation body; a convex part protruding toward one side of an axis direction in the axis direction; a second rotation body including an external gear meshing with the internal gear; a recess recessed toward onside in the axis direction from a surface facing the other side of the second rotation body in the axis direction and into which the convex part is inserted; a second bearing connecting the convex part and the recess; and a ram shaft connection part connected to the second rotation body and moved linearly in a reciprocating manner, wherein the internal gear, the external gear, the recess, the second bearing, and the convex part overlap each other.

5 Claims, 8 Drawing Sheets

RECIPROCATING LINEAR MOTION MECHANISM FOR CAN BODY MAKER AND CAN BODY MAKER

CROSS-REFERENCE TO RELATED APPLICATION

This application claims the benefit of priority to Japanese Patent Application No. 2020-123741, filed Jul. 20, 2020, Japanese Patent Application No. 2020-123740, filed Jul. 20, 2020, and Japanese Patent Application No. 2020-123744, filed Jul. 20, 2020, the contents of all of which are incorporated herein by reference in their entireties.

FIELD OF THE INVENTION

The present invention relates to a reciprocating linear motion mechanism for a can body maker and a can body maker.

BACKGROUND OF THE INVENTION

Conventionally, a bottomed cylindrical DI (Drawing & Ironing) can is known. The DI can is manufactured by subjecting a disc-shaped blank made of alloy such as aluminum and iron to cupping and DI processing. In the cupping, the blank is drawn to form a cup-shaped body. In the DI processing, the cup-shaped body is drawn and ironed between a punch and a die while being pressed by a cup holder.

As a can body maker that performs DI processing on the cup-shaped body, for example, one described in Japanese Unexamined Patent Application, First Publication No. 2018-54065 is known. This can body maker moves a punch linearly in a reciprocating manner in a predetermined stroke direction through a ram shaft by a reciprocating linear motion mechanism.

Specifically, the reciprocating linear motion mechanism includes a mechanism frame (housing) which includes an internal gear centered on a first center axis; a first rotation body which is supported by the mechanism frame to be rotatable around a first center axis; a second rotation body which is supported by the first rotation body to be rotatable around a second center axis separated from the first center axis in parallel and includes an external gear meshing with the internal gear, and an action portion (ram shaft connection part) which is provided in the second rotation body and moved linearly in a reciprocating manner along a predetermined direction orthogonal to the first center axis.

PATENT DOCUMENTS

[Patent Document 1] Japanese Unexamined Patent Application, First Publication No. 2018-54065

SUMMARY OF THE INVENTION

In the conventional can body maker, it is required to improve the production efficiency of the can. Further, it is required to extend the life of parts of the bearing connecting the first rotation body and the second rotation body to be relatively rotatable. Further, there is room for suppressing the outer shape of the reciprocating linear motion mechanism to be small.

A first object of the present invention is to provide a reciprocating linear motion mechanism for a can body maker and a can body maker capable of improving production efficiency of a can. A second object of the present invention is to provide a reciprocating linear motion mechanism for a can body maker and a can body maker capable of extending the life of parts of a bearing connecting a first rotation body and a second rotation body.

A third object of the present invention is to provide a reciprocating linear motion mechanism for a can body maker and a can body maker capable of suppressing an outer shape of a reciprocating linear motion mechanism to be small.

In the conventional reciprocating linear motion mechanism for the can body maker, the ram shaft connection part and the external gear of the second rotation body are integrally formed with each other by a single member. Therefore, the equipment for manufacturing this member is limited and a manufacturing cost increases. Further, the member including the external gear and the ram shaft connection part needs to be assembled to or separated from the apparatus together during the assembly of the reciprocating linear motion mechanism or the maintenance and replacement (hereinafter, abbreviated as the maintenance or the like) of the bearing or the like connecting the first rotation body and the second rotation body. For this reason, the work became large-scale and took a lot of time and effort.

A fourth object of the present invention is to provide a reciprocating linear motion mechanism for a can body maker and a can body maker capable of easily manufacturing members, reducing a manufacturing cost, and having good workability such as assembly and maintenance.

In the conventional reciprocating linear motion mechanism for the can body maker, there was room for improvement in that oil was stably supplied to the bearing supporting the second rotation body to be rotatable around the second center axis with respect to the first rotation body.

A fifth object of the present invention is to provide a reciprocating linear motion mechanism for a can body maker and a can body maker capable of stably supplying oil to a bearing connecting a first rotation body and a second rotation body.

An aspect of a reciprocating linear motion mechanism for a can body maker of the present invention includes: a housing including an internal gear centered on a first center axis (for example, in a first radial direction orthogonal to the first center axis); a first rotation body located inside the housing; a first bearing connecting the housing and the first rotation body to be relatively rotatable (for example, around the first center axis); a convex part protruding toward one side of an axis direction from a surface facing one side of the first rotation body in the axis direction and centered on a second center axis parallel to the first center axis; a second rotation body including an external gear meshing with the internal gear about the second center axis and disposed on one side of the first rotation body in the axis direction; a recess which is recessed toward one side in the axis direction from a surface facing the other side of the second rotation body in the axis direction and into which the convex part is inserted; a second bearing connecting the convex part and the recess to be relatively rotatable (for example, around the second center axis); and a ram shaft connection part connected to the second rotation body and moved linearly in a reciprocating manner along a predetermined direction (for example, in a first radial direction), wherein the internal gear, the external gear, the recess, the second bearing, and the convex part overlap each other when viewed from a radial direction orthogonal to the second center axis (for example, a second radial direction).

Further, an aspect of a can body maker of the present invention includes: the reciprocating linear motion mechanism for the can body maker; a ram shaft extending in the predetermined direction and of which one end portion is connected to the ram shaft connection part; a punch disposed at the other end portion of the ram shaft; a die including a through-hole into which the punch is inserted; and a cup holder pressed against an end surface to which the through-hole of the die opens.

According to the present invention, since the axis positions of the internal gear, the external gear, the recess, the second bearing, and the convex part are the same as each other, it is possible to suppress the bulkiness of the axial dimension of the reciprocating linear motion mechanism. Thus, it is possible to suppress the outer shape of the reciprocating linear motion mechanism in the axis direction to be small and to simplify the structure.

Since the outer shape of the reciprocating linear motion mechanism is suppressed to be small, it is possible to reduce the power consumption of the drive motor or the like that drives the reciprocating linear motion mechanism. Therefore, the production efficiency of the can is increased.

Since the axis position of the second bearing connecting the convex part and the recess, that is, the bearing connecting the first rotation body and the second rotation body is the same as the axis position of the meshing portion between the internal gear and the external gear, it is possible to suppress an unbalanced load from acting on the bearing. Accordingly, the load on the bearing is reduced and the life of parts of the bearing can be extended.

In the reciprocating linear motion mechanism for the can body maker, the second bearing may overlap the internal gear and the external gear over the entire length of the axis direction when viewed from the radial direction (for example, the second radial direction).

In this case, since the internal gear and the external gear mesh with each other, it is possible to suppress a load acting on the second bearing from the radial direction from varying at each position of the second bearing in the axis direction. Since a load on the second bearing is equalized in the axis direction, the function of the second bearing is maintained satisfactorily and the frequency of maintenance or the like can be reduced.

In the reciprocating linear motion mechanism for the can body maker, a part of the second bearing and a part of the first bearing may overlap each other when viewed from the axis direction.

For example, according to the configuration of the present invention, the diameter of the first bearing is suppressed to be small compared to a case in which the first bearing does not overlap the second bearing when viewed from the axis direction and disposed on the outside in relation to the second bearing. Therefore, the outer shape of the reciprocating linear motion mechanism can be suppressed to be small.

The reciprocating linear motion mechanism for the can body maker may include a gear which is provided in the first rotation body and is centered on the first center axis.

In this case, the rotational driving force around the first center axis of the first rotation body can be output to the outside of the reciprocating linear motion mechanism through a gear. For example, a cup holder driving mechanism or the like other than the reciprocating linear motion mechanism provided in the can body maker can be stably operated while being synchronized with the operation of the reciprocating linear motion mechanism.

An aspect of a reciprocating linear motion mechanism for a can body maker of the present invention includes: a housing including an internal gear centered on a first center axis (for example, in a radial direction orthogonal to the first center axis); a first rotation body located inside the housing and is connected to the housing to be relatively rotatable (for example, around the first center axis); a second rotation body including an external gear meshing with the internal gear about a second center axis parallel to the first center axis, is disposed on one side of the first rotation body in the axis direction, and is connected to the first rotation body to be relatively rotatable (for example, around the second center axis); and a ram shaft connection part connected to the second rotation body and moved linearly in a reciprocating manner along a predetermined direction (for example, in the radial direction), wherein the second rotation body includes the external gear and a connection part which is provided separately from the external gear, is located on one side of the external gear in the axis direction, and connects the external gear and the ram shaft connection part.

Further, an aspect of a can body maker of the present invention includes: the reciprocating linear motion mechanism for the can body maker; a ram shaft extending in the predetermined direction and of which one end portion is connected to the ram shaft connection part; a punch disposed at the other end portion of the ram shaft; a die including a through-hole into which the punch is inserted; and a cup holder pressed against an end surface to which the through-hole of the die opens.

According to the present invention, since the connection part and the external gear of the second rotation body are separated from each other, at least the external gear can be manufactured alone. The external gear can be easily manufactured without requiring particular equipment or the like and the manufacturing cost can be reduced. Further, the external gear and the connection part can be separately assembled or separated during the assembly of the reciprocating linear motion mechanism or the maintenance of parts of the bearing connecting the first rotation body, the second rotation body, and the like. Specifically, an operator can assemble the external gear and the connection part in this order from one side of the reciprocating linear motion mechanism (device) in the axis direction or separate the connection part and the external gear in this order from the device. Accordingly, each operation is simplified and the operation time is shortened. Thus, according to the present invention, the members can be easily manufactured, the manufacturing cost can be reduced, and the workability such as assembly and maintenance is good.

Since workability such as maintenance is good, it is possible to shorten the time for stopping the operation of the can body maker for maintenance or the like. That is, the operation time of the can body maker can be increased and the production efficiency of the can is improved.

When the operator separates the connection part from the external gear, it is easy to access, for example, the bearing disposed inside the external gear and connecting the first rotation body and the second rotation body from the outside of apparatus. Since the maintenance of the bearing is good, the function of the bearing can be maintained satisfactorily and the life of parts can be extended.

The reciprocating linear motion mechanism for the can body maker may further include a bearing connecting the first rotation body and the second rotation body to be relatively rotatable (for example, around the second center axis), the external gear may have a tubular shape extending in the axis direction, the connection part may block an opening on one side of the external gear in the axis direction, the first rotation body may include a convex part protruding toward one side in the axis direction from a surface facing one side of the first rotation body in the axis direction and inserted into the external gear, and the bearing may be interposed between an inner circumferential surface of the external gear and an outer circumferential surface of the convex part.

In this case, when the operator separates the connection part from one side of the axis direction, it is possible to easily access the bearing inside the external gear. That is, it is possible to access the bearing even when the external gear is not separated from the apparatus. If necessary, it is easy to separate the external gear or the bearing from the apparatus. Therefore, workability such as maintenance is improved. Further, the attachment structure of the bearing can be simplified and the reciprocating linear motion mechanism can have a compact configuration.

In the reciprocating linear motion mechanism for the can body maker, the connection part may include a first fitting hole which penetrates the connection part in the axis direction and a bolt insertion hole which penetrates the connection part in the axis direction, the external gear may include a second fitting hole which opens to a surface facing one side of the external gear in the axis direction and a female screw hole which opens to a surface facing one side of the external gear in the axis direction, and the second rotation body may include a pin member that is fitted to the first fitting hole and the second fitting hole and a bolt member that is inserted into the bolt insertion hole and is screwed into the female screw hole.

In this case, the connection part and the external gear can be fixed by the bolt member while the connection part and the external gear are positioned around the second center axis by the pin member. Therefore, the positional accuracy of the external gear and the ram shaft connection part connected to the connection part is stably ensured. Further, a force generated in the circumferential direction around the second center axis between the connection part and the external gear during the operation or the like of the reciprocating linear motion mechanism can be received by the pin member that is more easily to ensure rigidity than the bolt member. Accordingly, damage or the like the bolt member is suppressed. The relative movement of the connection part and the external gear in the circumferential direction around the second center axis is regulated by the pin member and the relative movement of the connection part and the external gear in the axis direction is regulated by the bolt member.

In the reciprocating linear motion mechanism for the can body maker, the external gear may have a tubular shape extending in the axis direction, and the connection part may include a fitting cylinder part protruding from a surface facing the other side of the connection part in the axis direction and fitted to an inner circumferential surface or an outer circumferential surface of the external gear.

In this case, since the external gear and the fitting cylinder part are fitted to each other, the external gear and the connection part are positioned in the radial direction orthogonal to the second center axis. Further, a force generated in the radial direction orthogonal to the second center axis between the connection part and the external gear during the operation or the like of the reciprocating linear motion mechanism can be received by the fitting cylinder part that is more easily to ensure rigidity than the bolt member. Accordingly, damage or the like of the bolt member is suppressed. The relative movement of the connection part and the external gear in the radial direction orthogonal to the second center axis is regulated by the fitting cylinder part.

An aspect of a reciprocating linear motion mechanism for a can body maker of the present invention includes: a housing including an internal gear centered on a first center axis (for example, in a first radial direction orthogonal to the first center axis); a first rotation body located inside the housing and is connected to the housing to be relatively rotatable (for example, around the first center axis); a second rotation body including an external gear meshing with the internal gear about a second center axis parallel to the first center axis; a bearing connecting the first rotation body and the second rotation body to be relatively rotatable (for example, around the second center axis); a ram shaft connection part connected to the second rotation body and moved linearly in a reciprocating manner along a predetermined direction (for example, in the first radial direction); and an oil supply path penetrating the internal gear and the external gear and supplies oil to the bearing, wherein the oil supply path includes an internal gear flow path extending through the internal gear and opens to at least internal teeth of the internal gear and an external gear flow path extending through the external gear and includes a portion opening to external teeth of the external gear and a portion opening to the bearing, and wherein when the external gear is disposed at a predetermined position around the first center axis with respect to the internal gear, the internal gear flow path and the external gear flow path communicate with each other through a meshing portion between the internal teeth and the external teeth.

Further, an aspect of the can body maker of the present invention includes: the reciprocating linear motion mechanism for the can body maker; a ram shaft extending in the predetermined direction and of which one end portion is connected to the ram shaft connection part; a punch disposed at the other end portion of the ram shaft; a die including a through-hole into which the punch is inserted; and a cup holder pressed against an end surface to which the through-hole of the die opens.

In the present invention, when the external gear revolves around the first center axis along the inner circumferential portion of the internal gear while turning around the second center axis to be disposed at a predetermined position around the first center axis, the internal gear flow path and the external gear flow path are connected to each other through a meshing portion between the internal teeth and the external teeth. Accordingly, oil inside the internal gear flow path flows into the external gear flow path. The oil flowing into the external gear flow path is discharged from the inside of the external gear flow path toward the bearing. According to the present invention, oil can be stably supplied to the bearing connecting the first rotation body and the second rotation body even during the operation of the can body maker. The bearing is stably cooled and lubricated by the oil and the performance of the bearing is maintained satisfactorily.

Since oil can be supplied to the bearing during the operation of the can body maker, the function of the bearing is maintained satisfactorily and the frequency of stopping the operation of the can body maker for the maintenance or the like of the bearing can be reduced. That is, the operation time of the can body maker can be increased and the production efficiency of the can is improved.

Since oil is stably supplied to the bearing connecting the first rotation body and the second rotation body, the life of parts of the bearing can be extended.

In the reciprocating linear motion mechanism for the can body maker, the first rotation body may include a convex part protruding toward one side in the axis direction from a surface facing one side of the first rotation body in the axis direction and centered on the second center axis, the second rotation body may include a recess which is recessed toward one side in the axis direction from a surface facing the other side of the second rotation body in the axis direction and into which the convex part is inserted, and the bearing may connect the convex part and the recess to be relatively rotatable (for example, around the second center axis).

In this case, the first rotation body and the second rotation body are connected to each other by the convex part, the recess, and the bearing interposed therebetween. Therefore, the structure of the reciprocating linear motion mechanism can be simplified.

In the reciprocating linear motion mechanism for the can body maker, the external gear flow path may penetrate the external gear in the radial direction (for example, the second radial direction) orthogonal to the second center axis.

In this case, the external gear flow path can be formed in, for example, a simple shape such as a linear hole, the friction loss (resistance) of the oil flowing through the external gear flow path can be reduced, and oil can be stably supplied to the bearing.

According to the reciprocating linear motion mechanism for the can body maker and the can body maker of an aspect of the present invention, the production efficiency of the can be improved. Further, the life of parts of the bearing connecting the first rotation body and the second rotation body to be relatively rotatable can be extended.

According to the reciprocating linear motion mechanism for the can body maker and the can body maker of an aspect of the present invention, the outer shape of the reciprocating linear motion mechanism can be suppressed to be small.

According to the reciprocating linear motion mechanism for the can body maker and the can body maker of an aspect of the present invention, members are easily manufactured, a manufacturing cost can be reduced, and workability such as assembly and maintenance is good.

According to the reciprocating linear motion mechanism for the can body maker and the can body maker of an aspect of the present invention, oil can be stably supplied to the bearing connecting the first rotation body and the second rotation body.

DETAILED DESCRIPTION OF THE INVENTION

A can body maker 1 and a reciprocating linear motion mechanism 10 for the can body maker 1 (hereinafter, simply referred to as the reciprocating linear motion mechanism 10 in some cases) of an embodiment of the present invention will be described with reference to the drawings.

Figure 1:
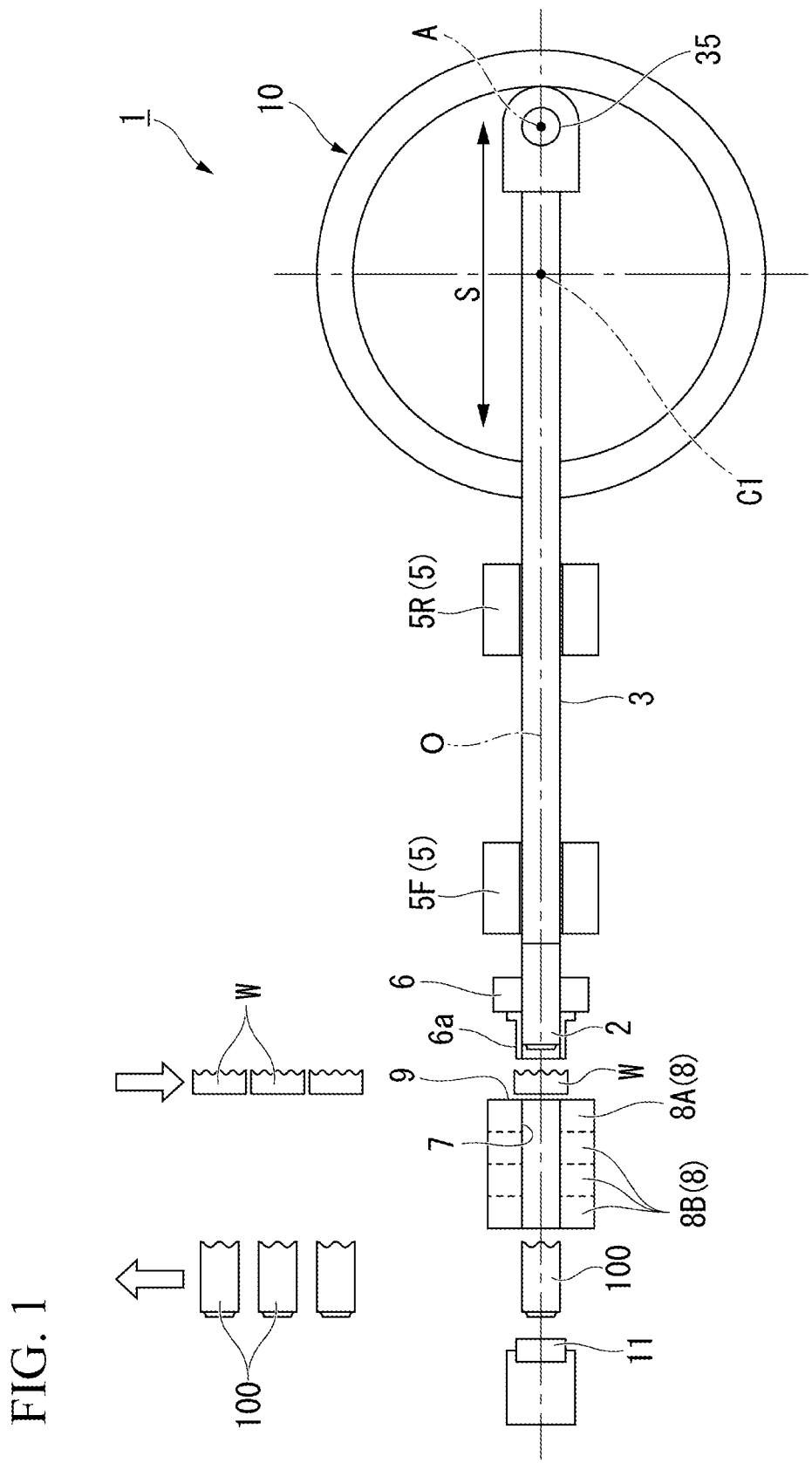
FIG. 1 is a schematic view showing a can body maker of an embodiment.

As shown in FIG. 1, the can body maker 1 of the embodiment is a DI can manufacturing apparatus which manufactures a DI can 100 by performing DI processing on a cup-shaped body W which is a workpiece.

First, the DI can 100 will be described.

The DI can 100 is a bottomed cylinder. The DI can 100 is used for a can body such as a two-piece can or a bottle can filled and sealed with the contents of a beverage or the like. In the case of the two-piece can, the can body includes the DI can 100 and a disc-shaped can lid wrapped around an opening end of the DI can 100. In the case of the bottle can, the can body includes a bottle can body obtained by performing necking, screwing, and the like on the DI can 100 and a cap screwed to an opening end of the bottle can body.

The DI can 100 is formed into a bottomed cylindrical shape by subjecting a disk-shaped blank punched from a plate material such as an aluminum alloy to a cupping step (drawing step) and a DI step (drawing and ironing step). Specifically, in the case of the two-piece can, for example, the DI can 100 is manufactured through a plate material punching step, a cupping step, a DI step, a trimming step, a printing step, an inner surface coating step, a necking step, and a flanging step in this order.

In the process of manufacturing the DI can 100, the blank is subjected to drawing (cupping) by a cupping press and is formed into the cup-shaped body W. That is, the cup-shaped body W is an intermediate produced in the process of transitioning from the blank to the DI can 100 in the cupping step. The cup-shaped body W has a bottomed cylindrical shape having a smaller circumferential wall height (a length in the can axis direction) and a larger diameter than the DI can 100.

Next, the can body maker 1 will be described.

The can body maker 1 is used for the DI step. The can body maker 1 performs DI processing, that is, drawing (redrawing) and ironing on the cup-shaped body W to form the DI can 100 having a larger circumferential wall height and a smaller diameter than the cup-shaped body W. Further, the can body maker 1 forms the can bottom of the DI can 100 into a dome shape in the above DI step. That is, in the embodiment, the can formed by the can body maker 1 is the DI can 100.

The can body maker 1 includes the reciprocating linear motion mechanism 10, a ram shaft 3 which extends in a predetermined direction (hereinafter, referred to as a stroke direction S in some cases) in which a ram shaft connection part 35 to be described later of the reciprocating linear motion mechanism 10 is moved linearly in a reciprocating manner and of which one end portion is connected to the ram shaft connection part 35, a punch 2 which is disposed at the other end portion of the ram shaft 3, a ram bearing 5 which supports the ram shaft 3 to be movable in a reciprocating manner along the axis direction of the center axis O of the ram shaft 3, a die 8 which has a through-hole 7 into which the punch 2 is inserted, a cup holder 6 which is pressed against an end surface 9 to which the through-hole 7 of the die 8 opens, and a dormer 11 which sandwiches the can bottom of the DI can 100 with the punch 2 and is formed in a dome shape.

The center axes O of the ram shaft 3, the punch 2, the ram bearing 5, the through-hole 7 of the die 8, the cup holder 6, and the dormer 11 are arranged coaxially with each other. In the embodiment, the center axis O which is a common axis of these members extends in the horizontal direction.

Further, the can body maker 1 includes a cup feeder (not shown) which supplies the cup-shaped body W onto the end surface 9 of the die 8, a receiving seat (not shown) which holds the cup-shaped body W on the end surface 9, a can conveying mechanism (not shown) which conveys the formed DI can 100 to the outside of the apparatus, an air discharge mechanism (not shown) which discharges air from an air discharge hole opening to at least any one of the front end surface and the outer circumferential surface of the punch 2 and separates the DI can 100 from the punch 2, a cup holder driving mechanism (not shown) which is driven in synchronization with the reciprocating linear motion mechanism 10 and moves the cup holder 6 in a reciprocating manner in the axis direction of the center axis O with a stroke length different from that of the ram shaft connection part 35 of the reciprocating linear motion mechanism 10, and a drive source (not shown) such as a drive motor.

The reciprocating linear motion mechanism 10 converts the rotational driving force around the first center axis C1 input from the drive source into the reciprocating linear motion in the stroke direction S along the center axis O and outputs the result to the ram shaft connection part 35. A detailed configuration of the reciprocating linear motion mechanism 10 will be described separately below.

The ram shaft 3 has an axial shape extending along the center axis O. The ram shaft 3 is slidably supported by the pair of ram bearings 5 disposed to be separated from each other in the axis direction of the center axis O.

The punch 2 has a cylindrical shape or a columnar shape extending along the center axis O.

The pair of ram bearings 5 is disposed between the reciprocating linear motion mechanism 10 and the die 8 in the axis direction of the center axis O. Of the pair of ram bearings 5, one ram bearing 5 disposed at a position close to the die 8 is a front bearing SF and the other ram bearing 5 disposed at a position close to the reciprocating linear motion mechanism 10 is a rear bearing 5R. The front bearing SF and the rear bearing 5R have a fluid bearing structure called, for example, a dynamic bearing or a hydrostatic bearing.

A plurality of the dies 8 are provided side by side in the axis direction of the center axis O. Each of the plurality of dies 8 includes a through-hole 7 which penetrates the die 8 in the axis direction of the center axis O and has a circular cross-section. The plurality of dies 8 include one redrawing die 8A and a plurality of ironing dies (ironing dies) 8B which are located on the side of the dormer 11 in relation to the redrawing die 8A. Although particularly not shown, each pilot ring is disposed on the side of the dormer 11 in each ironing die 8B. Since the pilot ring is provided, it is possible to suppress the punch 2 from contacting each ironing die 8B due to the impact generated when the DI can 100 is separated from (passed through) each ironing die 8B in forming.

Further, a coolant liquid for lubricating and cooling is supplied to the redrawing die 8A and each ironing die 8B in forming.

The cup holder 6 includes a cylindrical cup holder sleeve 6*a* which extends in the axis direction of the center axis O. The cup holder sleeve 6*a* is concentrically disposed on the outside of the punch 2 in the radial direction and is movable with respect to the punch 2 in the axis direction of the center axis O. The cup holder sleeve 6*a* is inserted into the cup-shaped body W disposed on the end surface 9 of the redrawing die 8A and holds the bottom wall of the cup-shaped body W to be pressed against the end surface 9. That is, the cup holder 6 supports the bottom wall of the cup-shaped body W to be pressed against the end surface 9 facing the reciprocating linear motion mechanism 10 in the die 8.

Although particularly not shown, the cup holder driving mechanism converts the rotational driving force transmitted from the drive source through the reciprocating linear motion mechanism 10 into the reciprocating motion in the axis direction of the center axis O and moves the cup holder 6 linearly in a reciprocating manner in the axis direction of the center axis O.

The dormer 11 is a mold for molding the can bottom of the DI can 100. The dormer 11 has a substantially cylindrical shape extending in the axis direction of the center axis O. When the punch 2 is disposed at the forward movement end position in the stroke direction S, the dormer 11 faces the punch 2 in the axis direction of the center axis O.

The air discharge mechanism includes an air discharge hole (not shown) which opens to the outer surface of the punch 2, an air supply path 28 to be described later (see FIG. 4) of the reciprocating linear motion mechanism 10, an air communication path (not shown) which allows the air discharge hole and the air supply path 28 to communicate with each other, and an air supply source (not shown).

Although particularly not shown, the air communication path includes a ram shaft flow path extending through the ram shaft 3 in the axis direction of the center axis O. The air supply source is, for example, an air compressor or the like and supplies air (compressed air) to the air supply path 28.

The can body maker 1 performs DI processing on the cup-shaped body W as below.

First, the cup-shaped body W which is a workpiece is disposed between the punch 2 and the redrawing die 8A in a posture in which the cup shaft (can shaft) is extended in the horizontal direction and the opening thereof is directed toward the punch 2. The bottom wall of the cup-shaped body W faces the end surface 9 of the redrawing die 8A.

The cup holder 6 and the punch 2 are moved forward in the axis direction of the center axis O with respect to the cup-shaped body W. That is, the cup holder 6 and the punch 2 are moved from the reciprocating linear motion mechanism 10 toward the side of the die 8, that is, the front side in the stroke direction S. Then, the cup-shaped body W is subjected to redrawing in such a manner that the punch 2 presses the cup-shaped body W into the through-hole 7 of the redrawing die 8A while the cup holder 6 performs an operation of cup-pressing the bottom wall of the cup-shaped body W against the end surface 9 of the redrawing die 8A.

Due to the redrawing, the cup-shaped body W is formed to have a small diameter and a long length in the cup axis direction. Further, ironing is performed while this cup-shaped body W is pressed by the punch 2 to sequentially pass through the through-holes 7 of the plurality of ironing dies 8B. That is, the circumferential wall of the cup-shaped body W is squeezed and stretched to increase the height of the circumferential wall and decrease the thickness of the circumferential wall so that the shape of the bottomed cylindrical DI can 100 is formed. The strength of the DI can 100 is increased in such a manner that cold work hardening is performed by squeezing the circumferential wall.

The ironed DI can 100 is pressed out from the through-hole 7 of the die 8 toward the dormer 11 by the punch 2. Then, the bottom portion (a portion corresponding to the can bottom) of the DI can 100 is pressed between the punch 2 and the dormer 11 so that the bottom portion of the DI can 100 is formed in a dome shape.

Next, the reciprocating linear motion mechanism 10 will be described.

Figure 2:
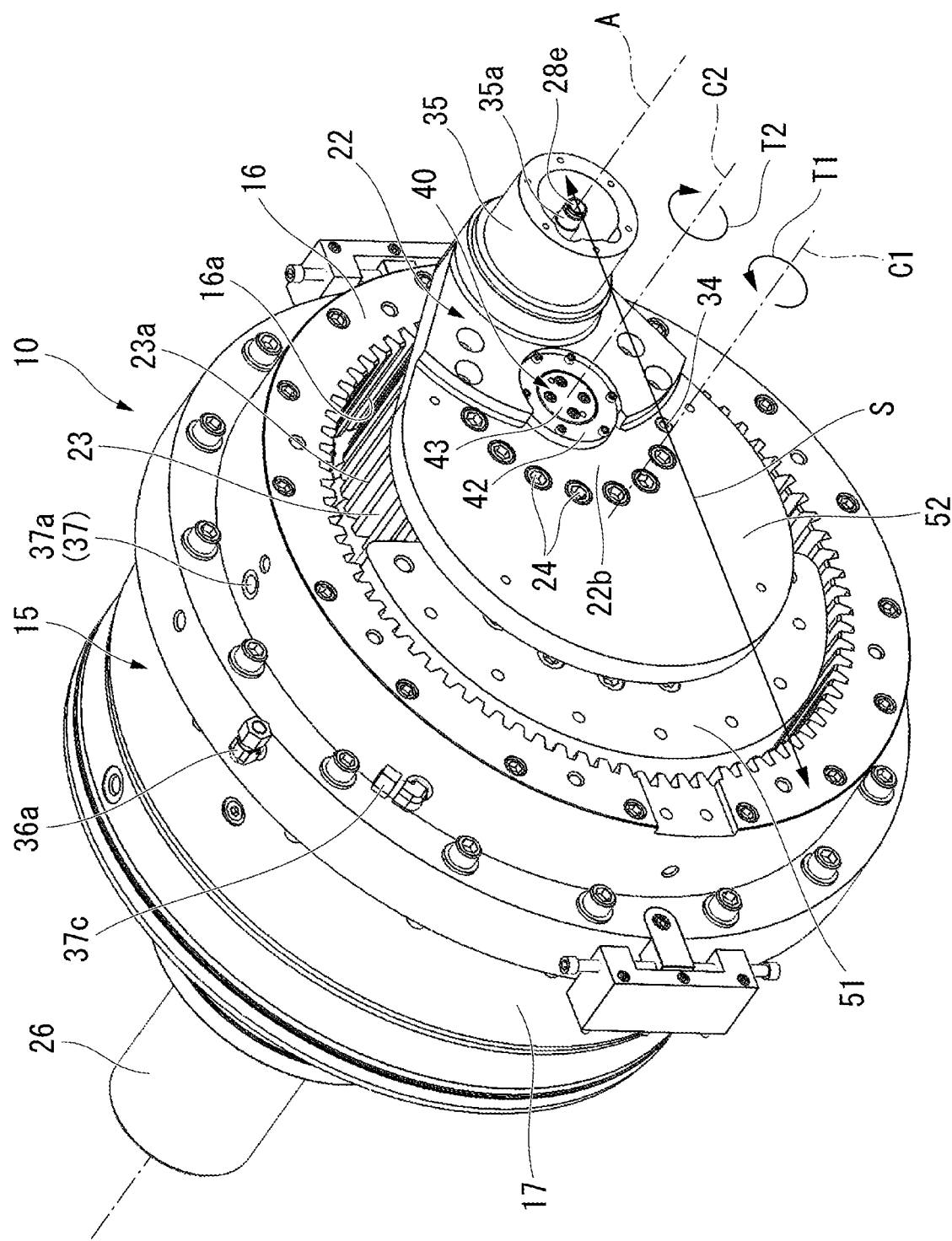
FIG. 2 is a perspective view showing a reciprocating linear motion mechanism for the can body maker of the embodiment.
Figure 3:
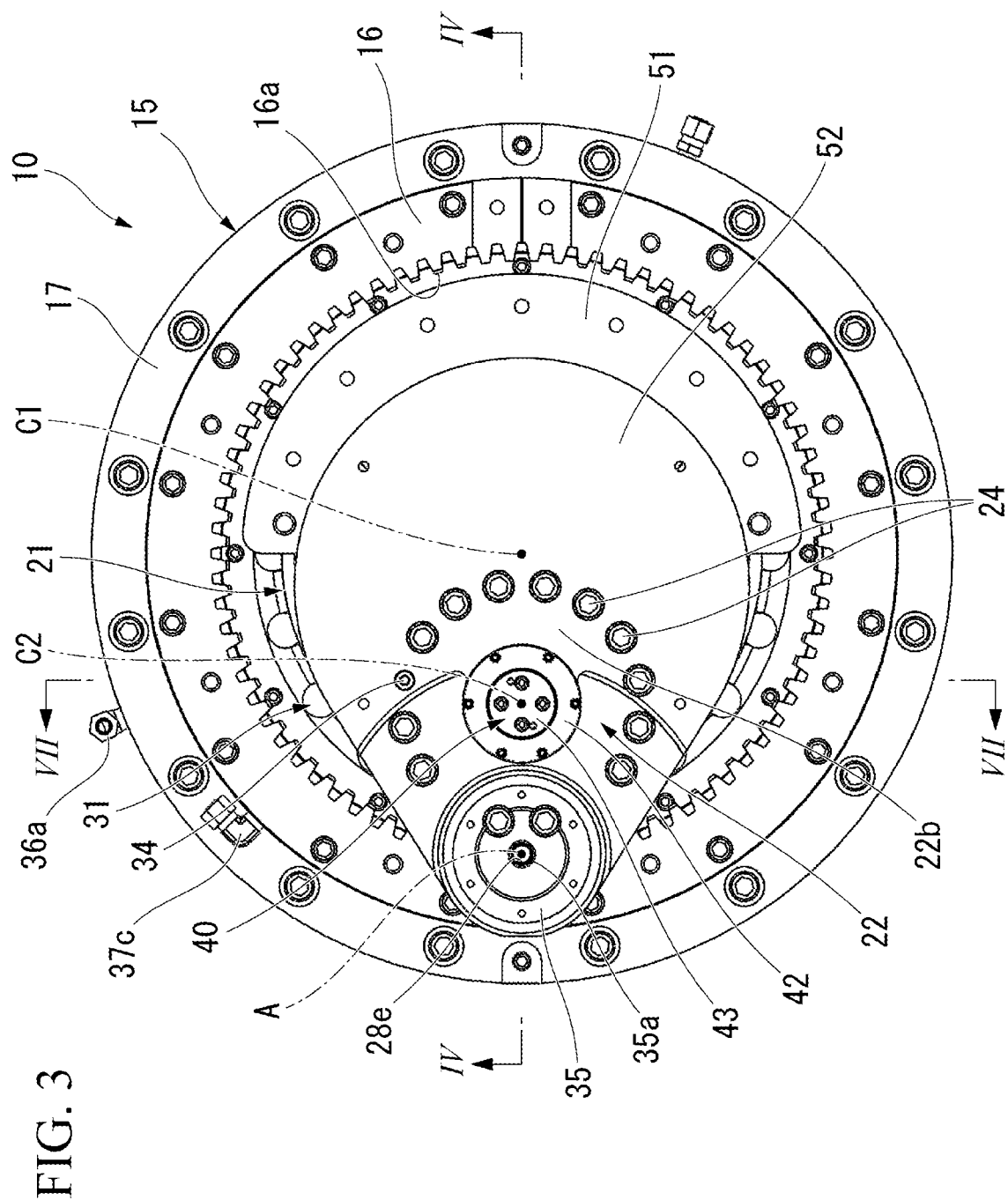
FIG. 3 is a front view showing the reciprocating linear motion mechanism for the can body maker of the embodiment.
Figure 4:
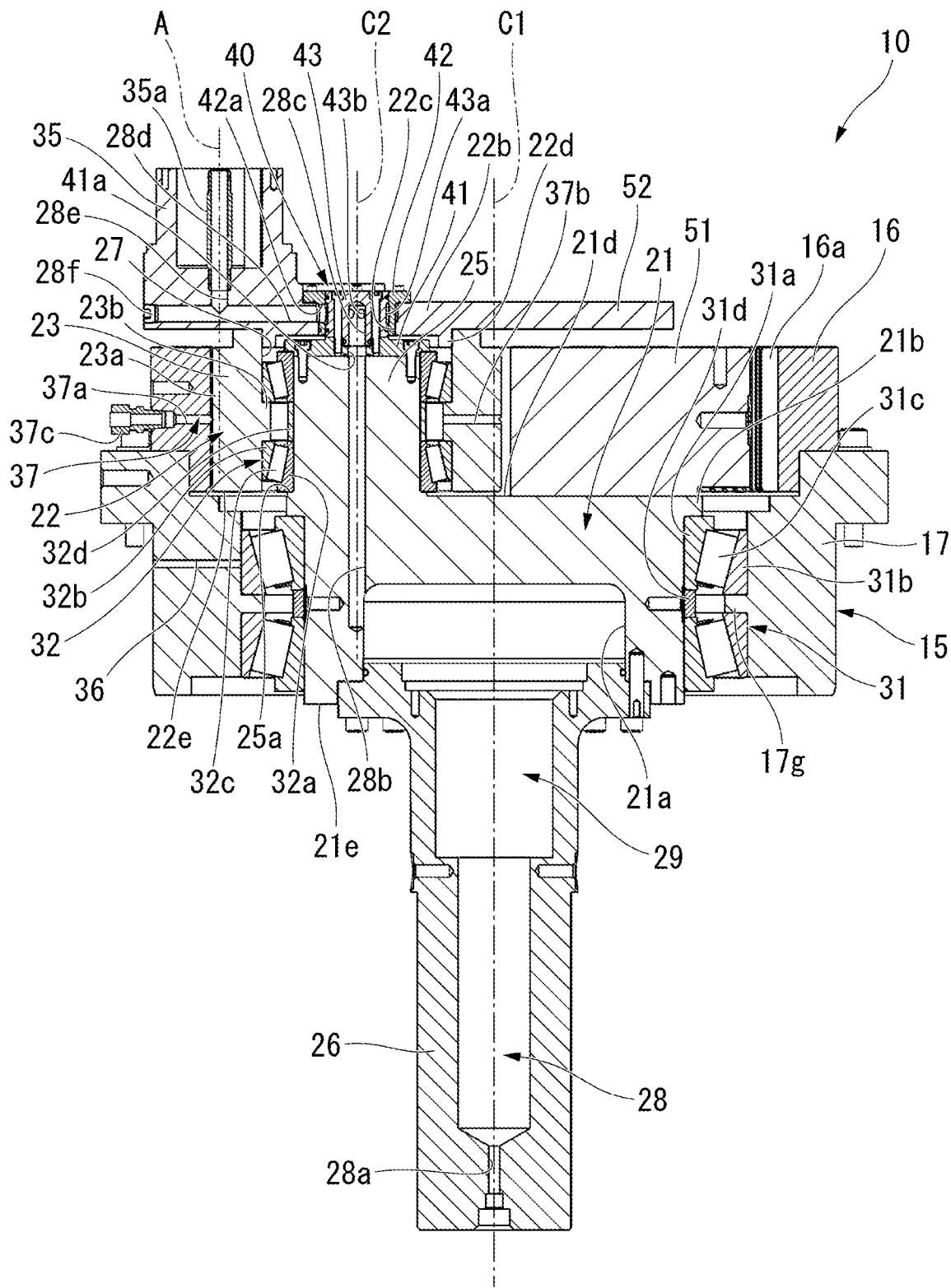
FIG. 4 is a cross-sectional view showing a cross-section of IV-IV of FIG. 3.

As shown in FIGS. 2 to 4, the reciprocating linear motion mechanism 10 includes a housing 15 having an internal gear 16, a first rotation body 21 having a convex part 25, a first bearing 31, a second rotation body 22 having a recess 27 and an external gear 23 meshing with the internal gear 16, a second bearing (bearing) 32, an air joint member 40, a ram shaft connection part 35, a first weight part 51, a second weight part 52, a shaft body 26, the air supply path 28, a first oil supply path 36, a second oil supply path (oil supply path) 37, and a gear (not shown). That is, the reciprocating linear motion mechanism 10 includes the convex part 25 and the recess 27.

The housing 15, the internal gear 16, a portion other than the convex part 25 of the first rotation body 21, the first bearing 31, the shaft body 26, and the gear are centered on the first center axis C1, that is, these members are coaxially disposed with the first center axis C1 as a common axis. The convex part 25, the second rotation body 22, the external gear 23, the recess 27, the second bearing 32, and the air joint member 40 are centered on the second center axis C2, that is, these members are coaxially disposed with the second center axis C2 as a common axis.

The first center axis C1 and the second center axis C2 are disposed to be parallel and away from each other. In the embodiment, the first center axis C1 and the second center axis C2 extend in the horizontal direction.

In the description below, the extension direction of the first center axis C1 and the extension direction of the second center axis C2 are simply referred to as the axis direction. In the axis direction, the first rotation body 21 and the ram shaft connection part 35 are disposed at different positions. In the axis direction, a direction from the first rotation body 21 toward the ram shaft connection part 35 is referred to as one side in the axis direction and a direction from the ram shaft connection part 35 toward the first rotation body 21 is referred to as the other side in the axis direction. Additionally, one side in the axis direction may be referred to as the front side and the other side in the axis direction may be referred to as the rear side.

A direction orthogonal to the first center axis C1 is referred to as a first radial direction (radial direction). In the first radial direction, a direction closer to the first center axis C1 is referred to as the inside of the first radial direction and a direction away from the first center axis C1 is referred to as the outside of the first radial direction.

A direction around the first center axis C1 is referred to as a first circumferential direction. In the first circumferential direction, a direction in which the first rotation body 21 is rotated with respect to the housing 15 at the time of operating the can body maker 1 is referred to as a first rotation direction T1.

A direction orthogonal to the second center axis C2 is referred to as a second radial direction (radial direction). In the second radial direction, a direction closer to the second center axis C2 is referred to as the inside of the second radial direction and a direction away from the second center axis C2 is referred to as the outside of the second radial direction.

A direction around the second center axis C2 is referred to as a second circumferential direction. In the second circumferential direction, a direction in which the second rotation body 22 is rotated with respect to the first rotation body 21 at the time of operating the can body maker 1 is referred to as a second rotation direction T2.

As shown in FIG. 4, the housing 15 has a tubular shape centered on the first center axis C1. The housing 15 includes an internal gear 16 and a housing body 17.

The internal gear 16 has an annular shape centered on the first center axis C1. The internal gear 16 has a cylindrical shape and extends in the axis direction. The internal gear 16 is disposed at one end portion of the housing 15 in the axis direction. The internal gear 16 is disposed at one opening of the housing 15 in the axis direction.

The internal gear 16 includes a plurality of internal teeth 16a which are provided on the inner circumferential portion of the internal gear 16 to be arranged in the first circumferential direction. The internal teeth 16a are disposed on the inner circumferential portion of the internal gear 16 over the entire length of the axis direction. In the embodiment, the internal teeth 16a are exposed to the outside of the reciprocating linear motion mechanism 10 through one opening of the housing 15 in the axis direction.

The housing body 17 has a cylindrical shape centered on the first center axis C1 and extends in the axis direction. The first rotation body 21 and the first bearing 31 are disposed on the inside of the housing body 17, that is, the inside of the first radial direction. The internal gear 16 is fixed to one end portion of the housing body 17 in the axis direction.

The housing body 17 includes a first outer race support part 17g. The first outer race support part 17g protrudes inward in the first radial direction from the inner circumferential surface of the housing body 17 and extends in the first circumferential direction. The first outer race support part 17g has a disc shape centered on the first center axis C1. A pair of plate surfaces of the first outer race support part 17g faces the axis direction.

The first rotation body 21 is located inside the housing 15 in the first radial direction. The first rotation body 21 is connected to the housing 15 to be relatively rotatable around the first center axis C1.

Figure 5:
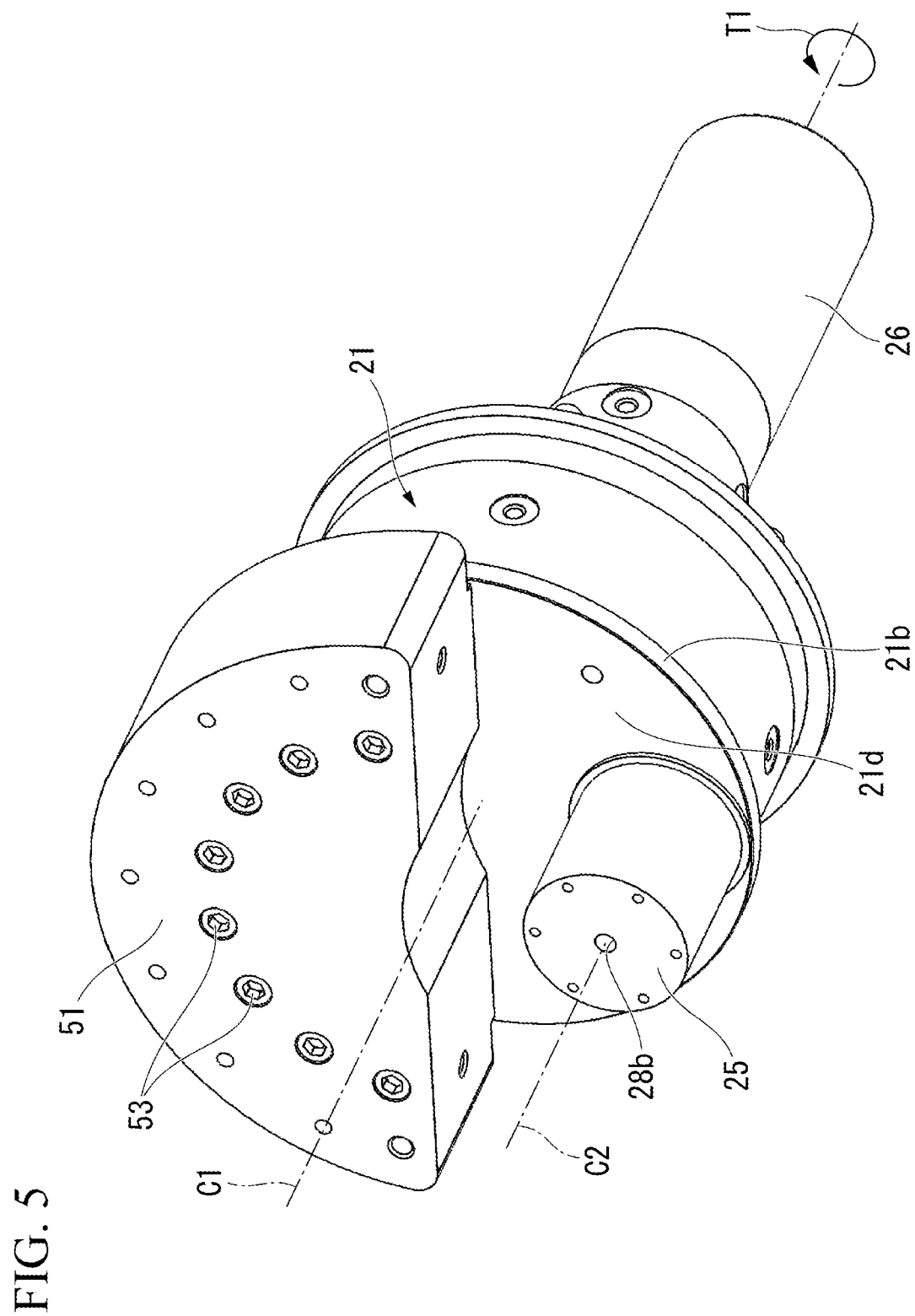
FIG. 5 is a perspective view showing a first rotation body, a convex part, a first weight part, and a shaft body.

As shown in FIGS. 4 and 5, the first rotation body 21 has a substantially columnar shape centered on the first center axis C1. The first rotation body 21 is disposed inside the housing body 17. That is, the first rotation body 21 is accommodated in the housing 15.

The first rotation body 21 includes a hole portion 21a, a flange portion 21b, and the convex part 25.

The hole portion 21a is recessed from a surface 21e facing the other side of the first rotation body 21 in the axis direction toward one side in the axis direction and extends in the axis direction. The hole portion 21a has a circular hole shape centered on the first center axis C1. Specifically, the hole portion 21a is recessed from a portion other than the outer circumferential portion in a surface 21e facing the other side of the first rotation body 21 in the axis direction toward one side in the axis direction. That is, the hole portion 21a opens to the other side in the axis direction.

The flange portion 21b is disposed at one end portion of the outer circumferential portion of the first rotation body 21 in the axis direction. The flange portion 21b has a disc shape centered on the first center axis C1. The flange portion 21b protrudes outward in the first radial direction from the outer circumferential surface of the first rotation body 21 and extends in the first circumferential direction. The pair of plate surfaces of the flange portion 21b faces the axis direction. Of the pair of plate surfaces of the flange portion 21b, the plate surface facing the other side in the axis direction contacts the inner race 31a of the first bearing 31 from one side in the axis direction.

The convex part 25 will be described below.

The first bearing 31 is, for example, a taper roller bearing or the like. The first bearing 31 can support a load (radial load) from the first radial direction and a load (axial load) from the axis direction. The first bearing 31 connects the housing 15 and the first rotation body 21 to be relatively rotatable around the first center axis C1.

The first bearing 31 includes an inner race 31a, a spacer 31d, an outer race 31b, and a rolling element 31c.

The inner race 31a has a tubular shape centered on the first center axis C1. The inner race 31a is fitted to the outer circumferential surface of the first rotation body 21. A plurality of the inner races 31a are provided side by side in the axis direction. In the embodiment, the first bearing 31 includes a pair of the inner races 31a which are arranged with a gap therebetween in the axis direction. The spacer 31d is disposed between the pair of inner races 31a. The spacer 31d has a tubular shape centered on the first center axis C1. The spacer 31d is fitted to the outer circumferential surface of the first rotation body 21.

Of the pair of inner races 31a, the one inner race 31a located on one side in the axis direction is disposed between the flange portion 21b and the spacer 31d in the axis direction. The flange portion 21b contacts the end surface facing one side in the axis direction of one inner race 31a. The spacer 31d contacts the end surface facing the other side in the axis direction of one inner race 31a.

The spacer 31d contacts the end surface facing one side in the axis direction.

The outer race 31b has a tubular shape centered on the first center axis C1. The outer race 31b is located on the outside of the first radial direction in relation to the inner race 31a. The outer race 31b is fitted to the inner circumferential surface of the housing body 17. A plurality of the outer races 31b are provided side by side in the axis direction. In the embodiment, the first bearing 31 includes a pair of the outer races 31b which are arranged with a gap therebetween in the axis direction. The first outer race support part 17g is disposed between the pair of outer races 31b.

Of the pair of outer races 31b, the first outer race support part 17g contacts the end surface facing the other side in the axis direction of the one outer race 31b located at one side in the axis direction.

The first outer race support part 17g contacts the end surface facing one side in the axis direction of the other outer race 31b located on the other side in the axis direction in the pair of outer races 31b.

The rolling element 31c is a columnar roller or the like. The rolling element 31c is disposed between the inner race 31a and the outer race 31b in the first radial direction. A plurality of the rolling elements 31c are provided side by side in the first circumferential direction. A plurality of rows of the rolling elements 31c arranged in the first circumferential direction (hereinafter, simply referred to as the rows of the rolling elements 31c) are provided side by side in the axis direction. In the embodiment, the first bearing 31 includes a row of a pair of the rolling elements 31c disposed with a gap therebetween in the axis direction.

Of the rows of the pair of rolling elements 31c, the row of the one rolling elements 31c located on one side in the axis direction is rotatably held between one inner race 31a and one outer race 31b.

Of the rows of the pair of rolling elements 31c, the row of the other rolling elements 31c located on the other side in the axis direction is rotatably held between the other inner race 31a and the other outer race 31b.

The convex part 25 protrudes from a surface 21d facing one side of the first rotation body 21 in the axis direction toward one side in the axis direction and extends in the axis direction. The convex part 25 has a columnar shape centered on the second center axis C2. Specifically, the convex part 25 protrudes from the outer portion of the first radial direction in the surface 21d facing one side of the first rotation body 21 in the axis direction toward one side in the axis direction.

The convex part 25 includes an outer circumferential step portion 25a.

The outer circumferential step portion 25a constitutes a part of the outer circumferential portion of the convex part 25. In the example shown in the drawings, the outer circumferential step portion 25a is disposed at the other end portion of the outer circumferential portion of the convex part 25 in the axis direction. The outer circumferential step portion 25a has an annular surface shape centered on the second center axis C2 and faces one side in the axis direction.

The second rotation body 22 is disposed on one side of the first rotation body 21 in the axis direction. The second rotation body 22 is connected to the first rotation body 21 to be relatively rotatable around the second center axis C2.

Figure 6:
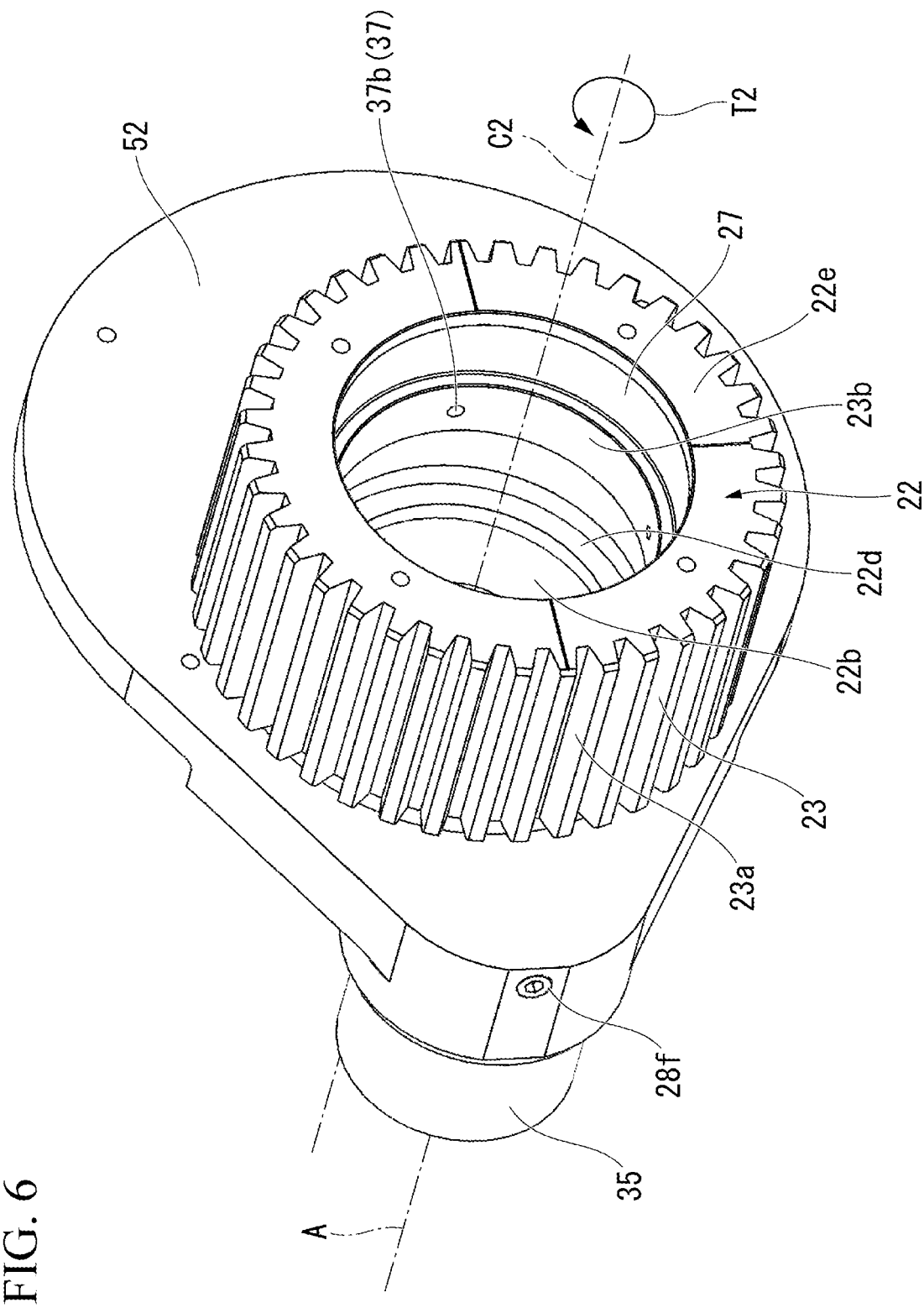
FIG. 6 is a perspective view showing a second rotation body, a recess, a second weight part, and a ram shaft connection part.
Figure 7:
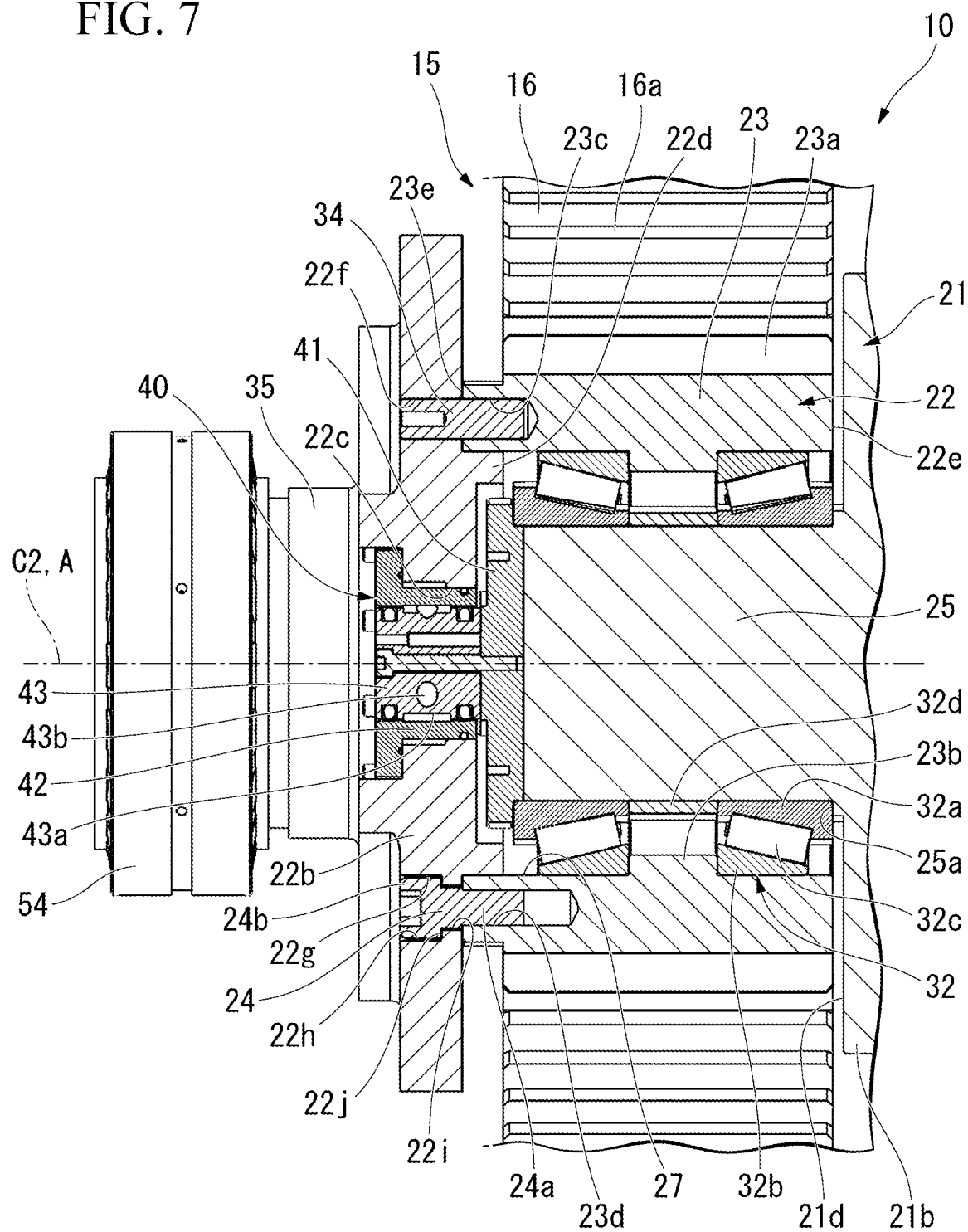
FIG. 7 is a partially cross-sectional view showing a cross-section of VII-VII of FIG. 3.

As shown in FIGS. 4, 6, and 7, the second rotation body 22 has a substantially eclipsed cylinder shape centered on the second center axis C2. The second rotation body 22 includes an external gear 23, a top wall portion (connection part) 22b, a pin member 34, a bolt member 24, a fitting insertion hole 22c, and a recess 27.

The external gear 23 has a tubular shape centered on the second center axis C2 and extends in the axis direction. The external gear 23 has a substantially cylindrical shape. As shown in FIG. 4, the convex part 25 is inserted into the external gear 23. A part of a surface 22e facing the other side of the external gear 23 in the axis direction faces a part of the surface 21d facing one side of the first rotation body 21 in the axis direction with a gap therebetween in the axis direction. The other part of the surface 22e facing the other side of the external gear 23 in the axis direction faces a part of the first bearing 31 with a gap therebetween in the axis direction.

The external gear 23 includes a plurality of external teeth 23a which are provided on the outer circumferential portion of the external gear 23 to be arranged in the second circumferential direction. The external teeth 23a are disposed at a portion other than one end portion of the outer circumferential portion of the external gear 23 in the axis direction. In the embodiment, the external teeth 23a pass through one opening of the housing 15 in the axis direction and are exposed to the outside of the reciprocating linear motion mechanism 10.

At least one or more of the plurality of external teeth 23a and at least one or more of the plurality of internal teeth 16a mesh with each other. The pitch circle diameter of the external teeth 23a of the external gear 23 is a half of the pitch circle diameter of the internal teeth 16a of the internal gear 16.

As shown in FIG. 7, the external gear 23 includes a second outer race support part 23b, a second fitting hole 23c, and a female screw hole 23d.

The second outer race support part 23b protrudes inward in the second radial direction from the inner circumferential surface of the external gear 23 and extends in the second circumferential direction. The second outer race support part 23*b* has a cylindrical shape centered on the second center axis C2. A pair of end surfaces of the second outer race support part 23*b* faces the axis direction.

The second fitting hole 23*c* opens to a surface 23*e* facing one side of the external gear 23 in the axis direction. The second fitting hole 23*c* has a circular hole shape and extends in the axis direction. In the embodiment, the second fitting hole 23*c* is a retaining hole of which one end portion in the axis direction opens to the surface 23*e* and the other end portion in the axis direction is closed. In the embodiment, one second fitting hole 23*c* is provided.

The female screw hole 23*d* opens to the surface 23*e* opening to one side of the external gear 23 in the axis direction. The female screw hole 23*d* has a circular hole shape and extends in the axis direction. The female screw hole 23*d* includes a female screw portion on the inner circumferential surface. In the embodiment, the female screw hole 23*d* is a retaining hole of which one end portion in the axis direction opens to the surface 23*e* and the other end portion in the axis direction is closed. A plurality of the female screw holes 23*d* are provided at intervals in the second circumferential direction. At least one of the plurality of female screw holes 23*d* is arranged side by side with the second fitting hole 23*c* in the second circumferential direction. Specifically, in the embodiment, the plurality of female screw holes 23*d* and the plurality of second fitting holes 23*c* are arranged in the second circumferential direction on a virtual circle (not shown) centered on the second center axis C2 when viewed from the axis direction (see FIG. 3).

In FIG. 2, the external gear 23 rotates (turns) in the second rotation direction T2 while rotating (revolving) in the first rotation direction T1 along the inner circumferential portion of the internal gear 16 at the time of operating the can body maker 1. In the embodiment, when the reciprocating linear motion mechanism 10 is viewed from one side in the axis direction, that is, the reciprocating linear motion mechanism 10 is viewed from the front side, the first rotation direction T1 is a counterclockwise direction about the first center axis C1 and the second rotation direction T2 is a clockwise direction about the second center axis C2. However, the present invention is not limited thereto. When the reciprocating linear motion mechanism 10 is viewed from one side in the axis direction, the first rotation direction T1 may be a clockwise direction about the first center axis C1 and the second rotation direction T2 may be a counterclockwise direction about the second center axis C2.

As shown in FIGS. 4 and 7, the top wall portion 22*b* is disposed on one side of the external gear 23 in the axis direction. The top wall portion 22*b* is separated from the external gear 23 and is located on one side of the external gear 23 in the axis direction. That is, the top wall portion 22*b* and the external gear 23 are manufactured as different members. In the embodiment, the top wall portion 22*b* has a plate shape that spreads in a direction perpendicular to the second center axis C2. The top wall portion 22*b* is connected to one end portion of the external gear 23 in the axis direction and the other end portion of the ram shaft connection part 35 in the axis direction. That is, the top wall portion 22*b* connects the external gear 23 and the ram shaft connection part 35. The top wall portion 22*b* blocks one opening of the external gear 23 in the axis direction. The top wall portion 22*b* may be paraphrased as a closing wall portion 22*b* or a front wall portion 22*b*. A surface facing the other side of the top wall portion 22*b* in the axis direction contacts the surface 23*e* facing one side of the external gear 23 in the axis direction.

As shown in FIG. 7, the top wall portion 22*b* includes a first fitting hole 22*f*, a bolt insertion hole 22*g*, and a fitting cylinder part 22*d*.

The first fitting hole 22*f* penetrates the top wall portion 22*b* in the axis direction. The first fitting hole 22*f* has a circular hole shape and extends in the axis direction. The first fitting hole 22*f* is a through-hole that opens to a surface facing one side of the top wall portion 22*b* in the axis direction and a surface facing the other side in the axis direction. In the example shown in the drawings, the inner diameter of the first fitting hole 22*f* is the same as the inner diameter of the second fitting hole 23*c*. In the embodiment, one first fitting hole 22*f* is provided.

The bolt insertion hole 22*g* penetrates the top wall portion 22*b* in the axis direction. The bolt insertion hole 22*g* has a multi-stage circular hole shape and extends in the axis direction. The bolt insertion hole 22*g* is a through-hole opening to a surface facing one side of the top wall portion 22*b* in the axis direction and a surface facing the other side in the axis direction. A plurality of the bolt insertion holes 22*g* are provided at intervals in the second circumferential direction. At least one of the plurality of bolt insertion holes 22*g* is provided side by side with the first fitting hole 22*f* in the second circumferential direction. Specifically, in the embodiment, the plurality of bolt insertion holes 22*g* and the plurality of first fitting holes 22*f* are arranged in the second circumferential direction on a virtual circle (not shown) centered on the second center axis C2 when viewed from the axis direction (see FIG. 3).

As shown in FIG. 7, the bolt insertion hole 22*g* includes a head portion arrangement portion 22*h*, a shaft portion arrangement portion 22*i*, and a step portion 22*j*.

The head portion arrangement portion 22*h* is located at a portion on one side of the bolt insertion hole 22*g* in the axis direction. The head portion arrangement portion 22*h* opens to one surface of the top wall portion 22*b* in the axis direction and extends in the axis direction. The head portion arrangement portion 22*h* has a circular hole shape.

The shaft portion arrangement portion 22*i* is located at a portion on the other side of the bolt insertion hole 22*g* in the axis direction. The shaft portion arrangement portion 22*i* opens to the other surface of the top wall portion 22*b* in the axis direction and extends in the axis direction. The shaft portion arrangement portion 22*i* has a circular hole shape. The inner diameter of the shaft portion arrangement portion 22*i* is smaller than the inner diameter of the head portion arrangement portion 22*h*. The shaft portion arrangement portion 22*i* and the head portion arrangement portion 22*h* communicate with each other.

The step portion 22*j* is disposed between the head portion arrangement portion 22*h* and the shaft portion arrangement portion 22*i*. The step portion 22*j* has an annular surface shape spreading in a direction perpendicular to the second center axis C2 and faces one side in the axis direction.

The fitting cylinder part 22*d* protrudes toward the other side in the axis direction from the surface facing the other side of the top wall portion 22*b* in the axis direction. The fitting cylinder part 22*d* has a tubular shape centered on the second center axis C2. The fitting cylinder part 22*d* is inserted into the external gear 23. The fitting cylinder part 22*d* is fitted to the inner circumferential surface of the external gear 23. That is, the fitting cylinder part 22*d* is fitted to the hole portion 27.

The pin member 34 has a columnar shape extending in the axis direction. The pin member 34 is inserted through the first fitting hole 22f and the second fitting hole 23c. The pin member 34 is fitted to the inner circumferential surfaces of the first fitting hole 22f and the second fitting hole 23c. That is, the pin member 34 is fitted to the first fitting hole 22f and the second fitting hole 23c. In the embodiment, one pin member 34 is provided.

The bolt member 24 has a multi-stage columnar shape extending in the axis direction. The bolt member 24 is inserted into the bolt insertion hole 22g and is screwed into the female screw hole 23d. The top wall portion 22b and the external gear 23 are fixed to each other by the bolt member 24.

The bolt member 24 includes a shaft portion 24a having a male screw portion formed on the outer circumferential surface and a head portion 24b having an outer diameter larger than that of the shaft portion 24a.

The male screw portion of the shaft portion 24a is screwed to the female screw portion of the female screw hole 23d. One end portion of the shaft portion 24a in the axis direction is disposed inside the shaft portion arrangement portion 22i.

The head portion 24b is disposed inside the head portion arrangement portion 22h. An end surface facing the other side of the head portion 24b in the axis direction contacts the step portion 22j.

The outer diameter of one end portion of the shaft portion 24a in the axis direction is smaller than the inner diameter of the shaft portion arrangement portion 22i. The outer diameter of the head portion 24b is smaller than the inner diameter of the head portion arrangement portion 22h. Therefore, a gap is provided between the outer circumferential surface of the bolt member 24 and the inner circumferential surface of the bolt insertion hole 22g.

As shown in FIGS. 2 and 3, a plurality of the bolt members 24 are provided. The plurality of bolt members 24 are arranged at intervals in the second circumferential direction. At least one of the plurality of bolt members 24 is provided side by side with the pin member 34 in the second circumferential direction. Specifically, in the embodiment, as shown in FIG. 3, the plurality of bolt members 24 and the plurality of pin members 34 are arranged in the second circumferential direction on a virtual circle (not shown) centered on the second center axis C2 when viewed from the axis direction. In the example shown in the drawings, at least one of the plurality of bolt members 24 is disposed inside the tubular ram shaft connection part 35 when viewed from the axis direction.

As shown in FIG. 4, the fitting insertion hole 22c penetrates the top wall portion 22b in the axis direction. The fitting insertion hole 22c has a circular hole shape centered on the second center axis C2.

The recess 27 is recessed from the surface 22e facing the other side of the second rotation body 22 in the axis direction toward one side in the axis direction and extends in the axis direction. The recess 27 has a circular hole shape centered on the second center axis C2. Specifically, the recess 27 is recessed from an inner portion of the second radial direction in the surface 22e facing the other side of the external gear 23 in the axis direction toward one side in the axis direction. That is, the recess 27 opens to the other side in the axis direction. One end portion of the recess 27 in the axis direction is blocked by the top wall portion 22b. The convex part 25 is inserted into the recess 27.

The second bearing 32 is, for example, a taper roller bearing or the like. The second bearing 32 can support a load (radial load) from the second radial direction and a load (axial load) from the axis direction. The second bearing 32 is interposed between the inner circumferential surface of the external gear 23, that is, the inner circumferential surface of the recess 27 and the outer circumferential surface of the convex part 25. The second bearing 32 connects the convex part 25 and the recess 27 to be relatively rotatable around the second center axis C2. That is, the second bearing 32 connects the first rotation body 21 and the second rotation body 22 to be relatively rotatable around the second center axis C2.

The second bearing 32 includes an inner race 32a, a spacer 32d, an outer race 32b, and a rolling element 32c.

The inner race 32a has a tubular shape centered on the second center axis C2. The inner race 32a is fitted to the outer circumferential surface of the convex part 25. A plurality of the inner races 32a are provided side by side in the axis direction. In the embodiment, the second bearing 32 includes a pair of the inner races 32a disposed with a gap therebetween in the axis direction. The spacer 32d is disposed between the pair of inner races 32a. The spacer 32d has a tubular shape centered on the second center axis C2. The spacer 32d is fitted to the outer circumferential surface of the convex part 25.

Of the pair of inner races 32a, the one inner race 32a located on one side of the axis direction is disposed between the spacer 32d and an inner ring retainer 41 to be described later of the air joint member 40 in the axis direction. The inner ring retainer 41 contacts the end surface facing one side of one inner race 32a in the axis direction. The spacer 32d contacts the end surface facing the other side of one inner race 32a in the axis direction. That is, one inner race 32a is sandwiched by the inner ring retainer 41 and the spacer 32d from both sides in the axis direction.

Of the pair of inner races 32a, the other inner race 32a located on the other side in the axis direction is disposed between the spacer 32d and the outer circumferential step portion 25a in the axis direction. The spacer 32d contacts the end surface facing one side of the other inner race 32a in the axis direction. The outer circumferential step portion 25a contacts the end surface facing the other side of the other inner race 32a in the axis direction. That is, the other inner race 32a is sandwiched by the spacer 32d and the outer circumferential step portion 25a from both sides in the axis direction.

Further, although particularly not shown, the surface 21d facing one side of the first rotation body 21 in the axis direction may contact an end surface facing the other side of the other inner race 32a in the axis direction. In this case, the other inner race 32a is sandwiched by the spacer 32d and the surface 21d facing one side of the first rotation body 21 in the axis direction from both sides in the axis direction.

The outer race 32b has a tubular shape centered on the second center axis C2. The outer race 32b is located on the outside of the second radial direction in relation to the inner race 32a. The outer race 32b is fitted to the inner circumferential surface of the external gear 23, that is, the inner circumferential surface of the recess 27. A plurality of the outer races 32b are provided side by side in the axis direction. In the embodiment, the second bearing 32 includes a pair of the outer races 32b disposed with a gap therebetween in the axis direction. The second outer race support part 23b is disposed between the pair of outer races 32b.

Of the pair of outer races 32b, the second outer race support part 23b contacts the end surface facing the other side in the axis direction of one outer race 32b located on one side in the axis direction.

Of the pair of outer races 32b, the second outer race support part 23b contacts the end surface facing one side in the axis direction of the other outer race 32b located on the other side in the axis direction.

The rolling element 32c is a columnar roller or the like. The rolling element 32c is disposed between the inner race 32a and the outer race 32b in the second radial direction. A plurality of the rolling elements 32c are provided side by side in the second circumferential direction. A plurality of rows of the rolling elements 32c arranged in the second circumferential direction (hereinafter, simply referred to as the rows of the rolling elements 32c) are provided side by side in the axis direction. In the embodiment, the second bearing 32 includes a row of a pair of the rolling elements 32c disposed with a gap therebetween in the axis direction.

Of the rows of the pair of rolling elements 32c, the row of one rolling elements 32c located on one side of the axis direction is rotatably held between one inner race 32a and one outer race 32b.

Of the rows of the pair of rolling elements 32c, the row of the other rolling elements 32c located on the other side in the axis direction is rotatably held between the other inner race 32a and the other outer race 32b.

The internal gear 16, the external gear 23, the recess 27, the second bearing 32, and the convex part 25 overlap each other when viewed from the second radial direction. That is, the internal gear 16, the external gear 23, the recess 27, the second bearing 32, and the convex part 25 respectively include a portion disposed at the same position in the axis direction. The second bearing 32 is disposed to overlap the internal gear 16 and the external gear 23 over the entire length in the axis direction when viewed from the second radial direction.

A part of the second bearing 32 in the second circumferential direction and a part of the first bearing 31 in the first circumferential direction are disposed to overlap each other when viewed from the axis direction. That is, a part of the second bearing 32 overlaps a part of the first bearing 31 when viewed from the axis direction.

The air joint member 40 is attached to the convex part 25 and the top wall portion 22b. The air joint member 40 is formed such that air can flow therein and constitutes a part of the flow path of the air supply path 28.

The air joint member 40 includes an inner ring retainer 41, an outer cylinder 42, and an inner cylinder 43.

The inner ring retainer 41 has a disc shape centered on the second center axis C2 to spread in a direction perpendicular to the second center axis C2. A plate surface facing the other side of the inner ring retainer 41 in the axis direction contacts the surface facing one side of the convex part 25 in the axis direction. The inner ring retainer 41 is fixed to the convex part 25 by screwing or the like. The outer circumferential portion of the inner ring retainer 41 protrudes outward in the second radial direction in relation to the outer circumferential surface of the convex part 25. The outer circumferential portion of the inner ring retainer 41 contacts one inner race 32a of the second bearing 32 from one side in the axis direction. That is, the inner ring retainer 41 presses the inner race 32a of the second bearing 32 from one side in the axis direction.

The inner ring retainer 41 includes a retainer air hole 41a.

The retainer air hole 41a penetrates the inner ring retainer 41 in the axis direction. The retainer air hole 41a has a circular hole shape centered on the second center axis C2.

The outer cylinder 42 has a cylindrical shape centered on the second center axis C2 and extends in the axis direction. The outer cylinder 42 is inserted into the fitting insertion hole 22c. The outer cylinder 42 is fitted to the inner circumferential surface of the fitting insertion hole 22c. The outer cylinder 42 is fixed to the top wall portion 22b by screwing or the like.

The outer cylinder 42 includes an outer cylinder air hole 42a.

The outer cylinder air hole 42a penetrates the circumferential wall of the outer cylinder 42 in the second radial direction. The outer cylinder air hole 42a is located on a virtual line connecting the second center axis C2 and the center axis A of the ram shaft connection part 35 when viewed from the axis direction.

The inner cylinder 43 has an eclipsed cylinder shape centered on the second center axis C2 and extends in the axis direction. The other end portion of the inner cylinder 43 in the axis direction contacts the plate surface facing one side of the inner ring retainer 41 in the axis direction. The inside of the inner cylinder 43 communicates with the retainer air hole 41a of the inner ring retainer 41. The inner cylinder 43 is fixed to the inner ring retainer 41 by screwing or the like. That is, the inner cylinder 43 is fixed to the convex part 25 through the inner ring retainer 41. The inner cylinder 43 and the outer cylinder 42 are relatively rotatable around the second center axis C2.

The inner cylinder 43 includes an inner cylinder air groove 43a and an inner cylinder air hole 43b.

The inner cylinder air groove 43a is recessed inward in the second radial direction from the outer circumferential surface of the inner cylinder 43 and extends in the second circumferential direction. The inner cylinder air groove 43a has an annular shape centered on the second center axis C2. The inner cylinder air groove 43a communicates with the outer cylinder air hole 42a.

The inner cylinder air hole 43b penetrates the circumferential wall of the inner cylinder 43 in the second radial direction. The inner cylinder air hole 43b extends in the second radial direction and opens to the inner circumferential surface of the inner cylinder 43 and the inner cylinder air groove 43a. The inside of the inner cylinder 43 and the inner cylinder air groove 43a communicate with each other through the inner cylinder air hole 43b. A plurality of the inner cylinder air holes 43b are provided side by side in the second circumferential direction. The plurality of inner cylinder air holes 43b are arranged radially around the second center axis C2.

As shown in FIGS. 2 to 4, the ram shaft connection part 35 is connected to the second rotation body 22 and is moved linearly in a reciprocating manner along a predetermined direction (stroke direction S) in the first radial direction. The ram shaft connection part 35 has a bottomed cylindrical shape and extends in the axis direction. The ram shaft connection part 35 opens to one side in the axis direction.

The ram shaft connection part 35 protrudes from the top wall portion 22b toward one side in the axis direction. The ram shaft connection part 35 is located on one side in the axis direction in relation to the housing 15. The ram shaft connection part 35 protrudes from the top wall portion 22b toward the outside of the second radial direction. In the embodiment, a part of the ram shaft connection part 35 (a part other than an air cylinder 35a to be described later) is integrally formed with the top wall portion 22b.

The center axis A of the ram shaft connection part 35 is parallel to the first center axis C1. The center axis A of the ram shaft connection part 35 is disposed in parallel to the second center axis C2 to be away therefrom. The distance between the center axis A and the second center axis C2 in the second radial direction is the same as the distance between the first center axis C1 and the second center axis C2 in the second radial direction. When the reciprocating linear motion mechanism 10 is viewed from the axis direction, the center axis A of the ram shaft connection part 35 is located on the pitch circle diameter of the external teeth 23a of the external gear 23.

The ram shaft connection part 35 includes an air cylinder 35a.

The air cylinder 35a is disposed inside the ram shaft connection part 35. The air cylinder 35a has a tubular shape centered on the center axis A and extends in the axis direction. The air cylinder 35a is formed such that air can flow therein and constitutes a part of the flow path of the air supply path 28.

In FIG. 1, the ram shaft connection part 35 is connected to the ram shaft 3 through a connection bearing 54 (see FIG. 7) provided in the outer circumferential portion of the ram shaft connection part 35. The connection bearing 54 connects the ram shaft connection part 35 and the ram shaft 3 to be relatively rotatable around the center axis A.

As shown in FIGS. 4 and 5, the first weight part 51 is connected to the first rotation body 21 and is located on the side opposite to the second center axis C2 with the first center axis C1 interposed therebetween in the first radial direction. The first weight part 51 functions as a so-called counterweight for maintaining a good rotational balance in the first circumferential direction when the first rotation body 21, the convex part 25, the second bearing 32, the second rotation body 22, the recess 27, the ram shaft connection part 35, and the second weight part 52 rotate around the first center axis C1.

The first weight part 51 is disposed on one side of the first rotation body 21 in the axis direction. The first weight part 51 has a semicircular plate shape. A surface facing the other side of the first weight part 51 in the axis direction contacts the surface 21d facing one side of the first rotation body 21 in the axis direction. An outer end portion, that is, an outer circumferential portion of the first weight part 51 in the first radial direction protrudes outward in the first radial direction in relation to the outer circumferential surface of the first rotation body 21. The outer circumferential portion of the first weight part 51 overlaps the first bearing 31 when viewed from the axis direction.

The first weight part 51 is fixed to the first rotation body 21 by a plurality of bolt members 53 arranged in the first circumferential direction. Each bolt member 53 extends in the axis direction. Each bolt member 53 is inserted into the bolt insertion hole penetrating the first weight part 51 in the axis direction and is screwed into the female screw hole of the first rotation body 21.

As shown in FIGS. 2 to 4 and FIG. 6, the second weight part 52 is connected to the second rotation body 22 and is located on the side opposite to the ram shaft connection part 35 with the second center axis C2 interposed therebetween in the second radial direction. The second weight part 52 functions as a so-called counterweight for maintaining a good rotational balance in the second circumferential direction when the second rotation body 22 and the ram shaft connection part 35 rotate around the second center axis C2.

The second weight part 52 protrudes outward in the second radial direction from the top wall portion 22b. The second weight part 52 and the top wall portion 22b have a substantially disc shape as a whole. The second weight part 52 is integrally formed with a part of the ram shaft connection part 35 and the top wall portion 22b.

As shown in FIG. 4, the shaft body 26 has a multi-stage columnar shape centered on the first center axis C1 and extends in the axis direction. The shaft body 26 is disposed on the other side of the first rotation body 21 in the axis direction. The outer diameter of the shaft body 26 is smaller than the outer diameter of the first rotation body 21. The outer diameter of one end portion of the shaft body 26 in the axis direction is larger than the outer diameter of the portion other than the one end portion of the shaft body 26 in the axis direction. One end portion of the shaft body 26 in the axis direction is fitted into the opening portion of the hole portion 21a of the first rotation body 21. One end portion of the shaft body 26 in the axis direction is fixed to the other end portion of the first rotation body 21 in the axis direction by a screw member or the like. That is, the shaft body 26 is fixed to the first rotation body 21.

The shaft body 26 is supported by a third bearing (not shown) to be rotatable around the first center axis C1. The rotational driving force of the first rotation direction T1 is input from a drive source (not shown) to the shaft body 26. The shaft body 26 and the first rotation body 21 are rotated in the first rotation direction T1 with respect to the housing 15 by the rotational driving force of the drive source.

The air supply path 28 is an air flow path which is formed inside the reciprocating linear motion mechanism 10. The air supply path 28 extends inside the shaft body 26, inside the first rotation body 21, inside the convex part 25, inside the air joint member 40, inside the top wall portion 22b of the second rotation body 22, and inside the ram shaft connection part 35.

The air supply path 28 includes a first air flow path 28a, an air chamber 29, a second air flow path 28b, an air joint flow path 28c, a third air flow path 28d, and a fourth air flow path 28e. The first air flow path 28a, the air chamber 29, the second air flow path 28b, the air joint flow path 28c, the third air flow path 28d, and the fourth air flow path 28e communicate with each other. Air supplied from an air supply source (not shown) to the air supply path 28 flows through the air supply path 28 from the upstream side to the downstream side in order of the first air flow path 28a, the air chamber 29, the second air flow path 28b, the air joint flow path 28c, the third air flow path 28d, and the fourth air flow path 28e.

The first air flow path 28a is disposed inside the shaft body 26. In the embodiment, the first air flow path 28a is located at the other end portion of the shaft body 26 in the axis direction and extends on the first center axis C1 in the axis direction.

The air chamber 29 is disposed inside the shaft body 26 and the first rotation body 21. The air chamber 29 is formed over a portion other than the other end portion of the shaft body 26 in the axis direction and the hole portion 21a of the first rotation body 21. The air chamber 29 extends on the first center axis C1 in the axis direction. The air chamber 29 has the largest flow path cross-sectional area and the largest volume among the flow paths constituting the air supply path 28. The air chamber 29 can temporarily store air (compressed air) inside the air chamber 29.

The second air flow path 28b is disposed inside the first rotation body 21 and the convex part 25. The second air flow path 28b extends on the second center axis C2 in the axis direction. The other end portion of the second air flow path 28b in the axis direction opens into the hole portion 21a. One end portion of the second air flow path 28b in the axis direction opens to a surface facing one side of the convex part 25 in the axis direction.

The air joint flow path 28c includes a retainer air hole 41a, an inside (inner space) of an inner cylinder 43, an inner cylinder air hole 43b, an inner cylinder air groove 43a, and an outer cylinder air hole 42a. Air flowing from the second air flow path 28b into the air joint flow path 28c flows through the retainer air hole 41a, the inner cylinder 43, the inner cylinder air hole 43b, the inner cylinder air groove 43a, and the outer cylinder air hole 42a in this order and flows out to the third air flow path 28d.

The third air flow path 28d is disposed inside the top wall portion 22b and extends in the second radial direction. The third air flow path 28d extends along a virtual line connecting the second center axis C2 and the center axis A of the ram shaft connection part 35 when viewed from the axis direction. An inner end portion of the third air flow path 28d in the second radial direction is connected to the outer cylinder air hole 42a. An outer end portion of the third air flow path 28d in the second radial direction is blocked by a plug 28f.

The fourth air flow path 28e is disposed inside the ram shaft connection part 35. The fourth air flow path 28e extends on the center axis A of the ram shaft connection part 35 in the axis direction. The other end portion of the fourth air flow path 28e in the axis direction is connected to the third air flow path 28d. One end portion of the fourth air flow path 28e in the axis direction is connected to an air communication path (not shown). A portion other than the other end portion of the fourth air flow path 28e in the axis direction is formed by (the inner space of) the air cylinder 35a.

The first oil supply path 36 penetrates the housing 15 and supplies oil to the first bearing 31. In the embodiment, the first oil supply path 36 penetrates the circumferential wall of the housing body 17. An outer end portion of the first oil supply path 36 in the first radial direction opens to the outer circumferential surface of the housing body 17. An inner end portion of the first oil supply path 36 in the first radial direction opens to the inner circumferential surface of the housing body 17. That is, the first oil supply path 36 extends through the housing 15 and opens toward the first bearing 31. Oil is supplied from the outside of the housing 15 to the first oil supply path 36 through a first oil supply port 36a (see FIG. 2) provided in the outer circumferential portion of the housing body 17.

A plurality of the first oil supply paths 36 are provided. The plurality of first oil supply paths 36 are arranged at intervals in the first circumferential direction. The plurality of first oil supply paths 36 include one first oil supply path 36 extending linearly through the housing body 17 and another first oil supply path 36 extending through the housing body 17 in a crank shape in a bent state.

In the embodiment, at least one first oil supply path 36 is disposed at a portion located above the first center axis C1 in the vertical direction of the housing body 17. Therefore, oil supplied to the first bearing 31 from above is likely to stably spread in the entire first bearing 31.

Figure 8:
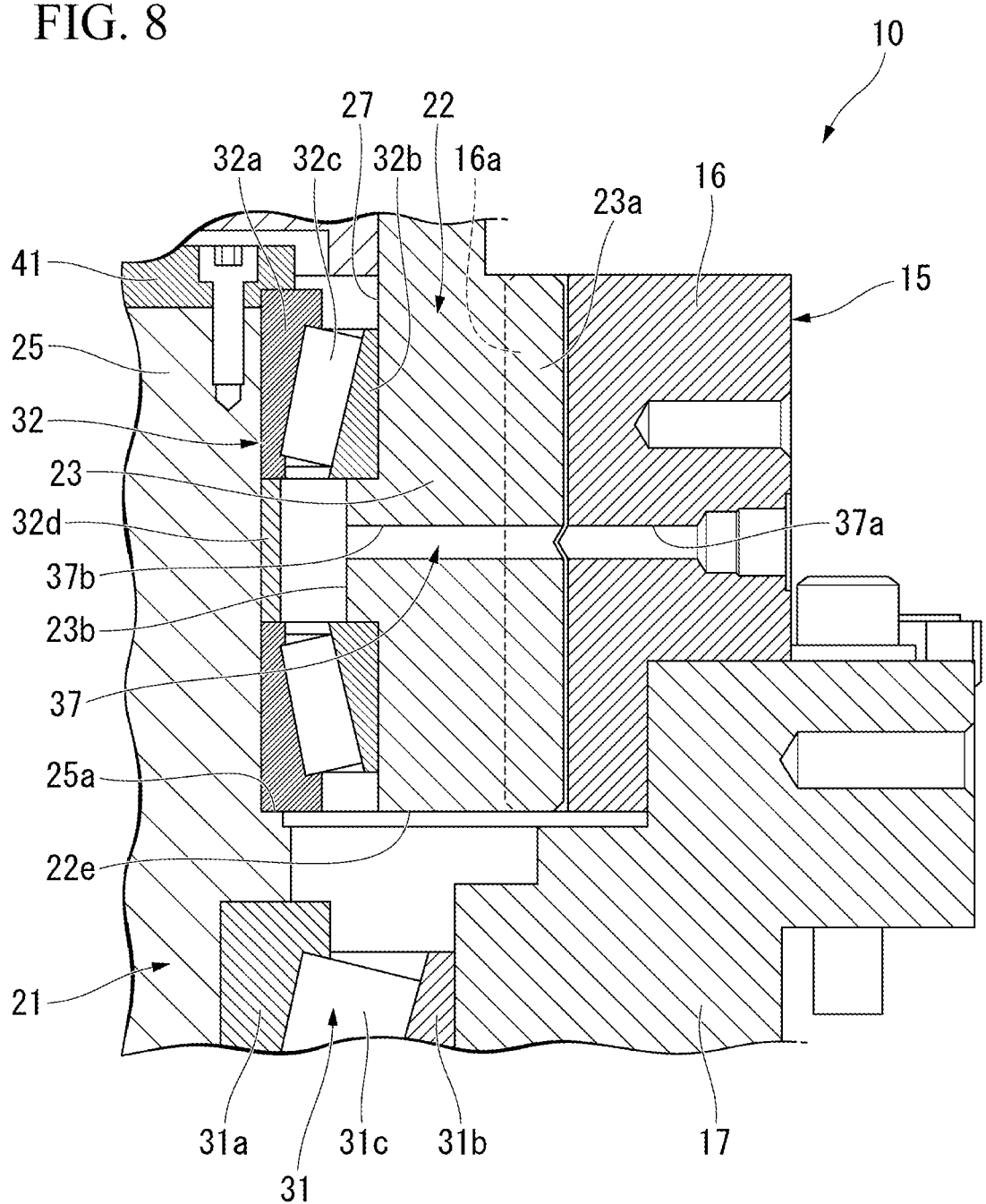
FIG. 8 is a partially cross-sectional view showing a state in which an external gear is disposed at a predetermined position around a first center axis with respect to an internal gear and shows a state in which an internal gear flow path and an external gear flow path of a second oil supply path communicate with each other.

As shown in FIGS. 4 and 8, the second oil supply path 37 penetrates the internal gear 16 and the external gear 23 and supplies oil to the second bearing 32. The second oil supply path 37 includes an internal gear flow path 37a and an external gear flow path 37b.

The internal gear flow path 37a penetrates the circumferential wall of the internal gear 16. In the embodiment, the internal gear flow path 37a penetrates the internal gear 16 in the first radial direction. The outer end portion of the internal gear flow path 37a in the first radial direction opens to the outer circumferential surface of the internal gear 16. The inner end portion of the internal gear flow path 37a in the first radial direction opens to the inner circumferential surface, that is, the internal teeth 16a of the internal gear 16. That is, the internal gear flow path 37a extends through the internal gear 16 and opens to at least the internal teeth 16a. Oil is supplied from the outside of the housing 15 to the internal gear flow path 37a through a second oil supply portion 37c provided in the outer circumferential portion of the internal gear 16.

The external gear flow path 37b penetrates the circumferential wall of the external gear 23. In the embodiment, the external gear flow path 37b penetrates the external gear 23 in the second radial direction. The outer end portion of the external gear flow path 37b in the second radial direction opens to the outer circumferential surface, that is, the external teeth 23a of the external gear 23. The inner end portion of the external gear flow path 37b in the second radial direction opens to the inner circumferential surface of the second outer race support part 23b. That is, the external gear flow path 37b extends through the external gear 23 and includes a portion opening to the external teeth 23a and a portion opening to the second bearing 32.

A plurality of the second oil supply paths 37 are provided. That is, a plurality of sets of the internal gear flow path 37a and the external gear flow path 37b are provided. In the embodiment, for example, three or more second oil supply paths 37 are provided. That is, three or more sets of the internal gear flow path 37a and the external gear flow path 37b are provided. The plurality of internal gear flow paths 37a are arranged at intervals in the first circumferential direction. The plurality of external gear flow paths 37b are provided at intervals in the second circumferential direction.

As shown in FIG. 8, when the external gear 23 is disposed at a predetermined position around the first center axis C1 with respect to the internal gear 16, the internal gear flow path 37a and the external gear flow path 37b face each other and communicate with each other in the first radial direction. Specifically, when the external gear 23 revolves in the first circumferential direction along the inner circumferential portion of the internal gear 16 while rotating in the second circumferential direction to be disposed at a predetermined position in the first circumferential direction, the internal gear flow path 37a and the external gear flow path 37b communicate with each other through a meshing portion between the internal teeth 16a and the external teeth 23a. Accordingly, oil in the internal gear flow path 37a flows into the external gear flow path 37b and oil in the external gear flow path 37b flows through the external gear flow path 37b inward in the second radial direction and is discharged toward the second bearing 32.

The number of the internal teeth 16a of the internal gear 16 is twice the number of the external teeth 23a of the external gear 23. Therefore, the internal gear flow path 37a and the external gear flow path 37b face each other at the predetermined position at each rotation, that is, each revolution around the first center axis C1 of the external gear 23. That is, the inflow of oil from the internal gear flow path 37a to the external gear flow path 37b and the discharge of oil from the external gear flow path 37b to the second bearing 32 are performed at each revolution of the external gear 23.

In the embodiment, at least one internal gear flow path 37a is disposed at a portion located above the first center axis C1 in the vertical direction of the internal gear 16. Further, at least one external gear flow path 37b faces and communicates with the internal gear flow path 37a at a portion located above the second center axis C2 in the vertical direction of the external gear 23. That is, when the internal gear flow path 37a and the external gear flow path 37b communicate with each other, oil flowing through the internal gear flow path 37a is supplied to the second bearing 32 from above through the external gear flow path 37b. Therefore, oil is likely to stably spread in the entire second bearing 32.

Although particularly not shown, the gear has a disc shape centered around the first center axis C1. The inner circumferential surface of the gear is fitted to the outer circumferential surface of one end portion of the shaft body 26 in the axis direction. A surface facing one side of the gear in the axis direction contacts the surface 21e facing the other side of the first rotation body 21 in the axis direction. The gar is fixed to the surface 21e facing the other side of the first rotation body 21 in the axis direction by a screw fixing or the like. That is, the gear is provided in the first rotation body 21. Further, the gear may be fixed to the shaft body 26. At least a part of the gear is exposed to the outside of the housing 15. The gear is connected to a cup holder driving mechanism (not shown) or the like through a connection gear (not shown). The gear outputs the rotational driving force around the first center axis C1 of the first rotation body 21 and the shaft body 26 to the outside of the reciprocating linear motion mechanism 10.

In the reciprocating linear motion mechanism 10 of the above-described embodiment, when the rotational driving force around the first center axis C1 is transmitted from a drive source (not shown) to the shaft body 26 and the first rotation body 21, the first rotation body 21 is rotated around the first center axis C1 with respect to the housing 15. When the first rotation body 21 is rotated around the first center axis C1, the second rotation body 22 supported by the first rotation body 21 is also rotated around the first center axis C1.

At this time, since the external gear 23 of the second rotation body 22 meshes with the internal gear 16 of the housing 15, the second rotation body 22 is also rotated (turned) around the second center axis C2 while being rotated (revolved) around the first center axis C1. When the reciprocating linear motion mechanism 10 is viewed from the axis direction, the first rotation direction T1 in which the second rotation body 22 is revolved around the first center axis C1 and the second rotation direction T2 in which the second rotation body 22 is turned around the second center axis C2 are opposite to each other.

The ram shaft connection part 35 connected to the second rotation body 22 is moved linearly in a reciprocating manner along a predetermined direction, that is, the stroke direction S in the first radial direction.

In this way, the reciprocating linear motion mechanism 10 of the embodiment converts the rotational driving force input to the first rotation body 21 into the reciprocating linear motion in the stroke direction S and outputs the result to the ram shaft connection part 35. Accordingly, the punch 2 connected to the ram shaft connection part 35 through the ram shaft 3 is moved linearly in a reciprocating manner in the stroke direction S. Thus, it is possible to perform DI processing on the cup-shaped body W by the punch 2, the die 8, the cup holder 6, and the like and to form the cup-shaped body W as the DI can 100.

Then, according to the embodiment, the internal gear 16, the external gear 23, the recess 27, the second bearing 32, and the convex part 25 are disposed to overlap each other when viewed from the second radial direction. That is, since the axis positions of the internal gear 16, the external gear 23, the recess 27, the second bearing 32, and the convex part 25 are the same as each other, it is possible to suppress the bulkiness of the axial dimension of the reciprocating linear motion mechanism 10. Thus, it is possible to suppress the outer shape of the reciprocating linear motion mechanism 10 in the axis direction to be small and to simplify the structure.

Since the outer shape of the reciprocating linear motion mechanism 10 is suppressed to be small, it is possible to reduce the power consumption of the drive motor or the like that drives the reciprocating linear motion mechanism 10. Therefore, the production efficiency of the DI can 100 is improved.

Since the axis position of the second bearing 32 connecting the convex part 25 and the recess 27, that is, the bearing 32 connecting the first rotation body 21 and the second rotation body 22 is the same as the axial position of the meshing portion between the internal gear 16 and the external gear 23, it is possible to suppress an unbalanced load from acting on the bearing 32. Accordingly, the load on the bearing 32 is reduced and the life of the parts of the bearing 32 can be extended.

Further, in the embodiment, the second bearing 32 is disposed to overlap the internal gear 16 and the external gear 23 over the entire length in the axis direction when viewed from the second radial direction.

In this case, since the internal gear 16 and the external gear 23 mesh with each other, it is possible to suppress a load acting on the second bearing 32 from the second radial direction from varying at each position of the second bearing 32 in the axis direction. Since a load on the second bearing 32 is equalized in the axis direction, the function of the second bearing 32 is maintained satisfactorily and the frequency of maintenance or the like can be reduced.

Further, in the embodiment, a part of the second bearing 32 and a part of the first bearing 31 overlap each other when viewed from the axis direction.

For example, according to the above-described configuration of the embodiment, the diameter of the first bearing 31 is suppressed to be small compared to a case in which the first bearing 31 does not overlap the second bearing 32 when viewed from the axis direction and disposed on the outside of the first radial direction in relation to the second bearing 32 unlike the embodiment. Therefore, it is possible to suppress the outer shape of the reciprocating linear motion mechanism 10 in the first radial direction to be small.

Further, in the embodiment, the rotational driving force around the first center axis C1 of the first rotation body 21 can be output to the outside of the reciprocating linear motion mechanism 10 through a gear. For example, the cup holder driving mechanism and the like other than the reciprocating linear motion mechanism 10 provided in the can body maker 1 can be stably operated while being synchronized with the operation of the reciprocating linear motion mechanism 10.

Then, according to the embodiment, since the top wall portion 22b and the external gear 23 of the second rotation body 22 are separated from each other, at least the external gear 23 can be manufactured alone. The external gear 23 can be easily manufactured without requiring particular equipment or the like and the manufacturing cost can be reduced. Further, the external gear 23 and the top wall portion 22b can be separately assembled to or separated from the apparatus during the assembly of the reciprocating linear motion mechanism 10 or the maintenance or the like of parts of the second bearing 32 or the like connecting the first rotation body 21 and the second rotation body 22. Specifically, an operator can assemble the external gear 23 and the top wall portion 22b to the apparatus in this order from one side of the reciprocating linear motion mechanism (device) 10 in the axis direction or separate the top wall portion 22b and the external gear 23 in this order from the device. Accordingly, each operation is simplified and the operation time is shortened. Thus, according to the embodiment, the members can be easily manufactured, the manufacturing cost can be reduced, and the workability such as assembly and maintenance is good.

Since workability such as maintenance is good, it is possible to shorten the time for stopping the operation of the can body maker 1 for maintenance or the like. That is, the operation time of the can body maker 1 can be increased and the production efficiency of the DI can 100 is improved.

When the operator separates the top wall portion 22b from the external gear 23, it is easy to access the bearing 32 disposed inside the external gear 23 and connecting the first rotation body 21 and the second rotation body 22 from the outside of the apparatus. Since the maintenance of the bearing 32 is good, the function of the bearing 32 can be maintained satisfactorily and the life of parts can be extended.

Further, in the embodiment, the external gear 23 has a tubular shape centered on the second center axis C2, the top wall portion 22b blocks one opening of the external gear 23 in the axis direction, and the second bearing 32 is interposed between the inner circumferential surface of the external gear 23 and the outer circumferential surface of the convex part 25.

In this case, it is possible to easily access the second bearing 32 inside the external gear 23 when the operator separates the top wall portion 22b from one side in the axis direction. That is, it is possible to access the second bearing 32 even when the external gear 23 is not separated from the apparatus. If necessary, the external gear 23 or the second bearing 32 can be easily separated from the apparatus. Therefore, workability such as maintenance is improved. Further, the attachment structure of the second bearing 32 can be simplified and the reciprocating linear motion mechanism 10 can have a compact configuration.

Further, in the embodiment, the pin member 34 is fitted to the first fitting hole 22f and the second fitting hole 23c and the bolt member 24 is inserted into the bolt insertion hole 22g and is screwed into the female screw hole 23d.

In this case, the top wall portion 22b and the external gear 23 can be fixed by the bolt member 24 while the top wall portion 22b and the external gear 23 are positioned around the second center axis C2 by the pin member 34. Therefore, the positional accuracy of the external gear 23 and the ram shaft connection part 35 connected to the top wall portion 22b is stably ensured. Further, a force generated in the second circumferential direction between the top wall portion 22b and the external gear 23 during the operation or the like of the reciprocating linear motion mechanism 10 can be received by the pin member 34 which can more easily ensure rigidity than the bolt member 24. Accordingly, damage or the like of the bolt member 24 is suppressed. The relative movement of the top wall portion 22b and the external gear 23 in the second circumferential direction is regulated by the pin member 34 and the relative movement of the top wall portion 22b and the external gear 23 in the axis direction is regulated by the bolt member 24.

Further, in the embodiment, the top wall portion 22b includes a fitting cylinder part 22d which is fitted to the inner circumferential surface of the cylindrical external gear 23.

In this case, since the external gear 23 and the fitting cylinder part 22d are fitted to each other, the external gear 23 and the top wall portion 22b are positioned in the second radial direction. Further, a force generated in the second radial direction between the top wall portion 22b and the external gear 23 during the operation or the like of the reciprocating linear motion mechanism 10 can be received by the fitting cylinder part 22d which can more easily ensure rigidity than the bolt member 24. Accordingly, damage or the like the bolt member 24 is suppressed. The relative movement of the top wall portion 22b and the external gear 23 in the second radial direction is regulated by the fitting cylinder part 22d.

Then, in the embodiment, when the external gear 23 revolves around the first center axis C1 along the inner circumferential portion of the internal gear 16 while turning around the second center axis C2 to be disposed at a predetermined position around the first center axis C1 as shown in FIG. 8, the internal gear flow path 37a and the external gear flow path 37b are connected through a meshing portion between the internal teeth 16a and the external teeth 23a. Accordingly, oil inside the internal gear flow path 37a flows into the external gear flow path 37b. The oil flowing into the external gear flow path 37b is discharged from the inside of the external gear flow path 37b toward the second bearing 32. According to the embodiment, oil can be stably supplied to the second bearing 32 connecting the first rotation body 21 and the second rotation body 22 even during the operation of the can body maker 1. The second bearing 32 is stably cooled and lubricated by oil and the performance of the second bearing 32 is maintained satisfactorily.

Since oil can be supplied to the second bearing 32 during the operation of the can body maker 1, the function of the second bearing 32 is maintained satisfactorily and the frequency of stopping the operation of the can body maker 1 for the maintenance or the like of the second bearing 32 can be reduced. That is, the operation time of the can body maker 1 can be increased and the production efficiency of the DI can 100 is improved.

Since oil is stably supplied to the second bearing 32 connecting the first rotation body 21 and the second rotation body 22, the life of parts of the second bearing 32 can be extended.

Further, in the embodiment, the first rotation body 21 and the second rotation body 22 are connected to each other by the convex part 25, the recess 27, and the second bearing 32 interposed therebetween, that is, the second bearing 32 connects the convex part 25 and the recess 27 to be relatively rotatable around the second center axis C2. Therefore, it is possible to simplify the structure of the reciprocating linear motion mechanism 10.

Further, in the embodiment, the external gear flow path 37b penetrates the external gear 23 in the second radial direction.

In this case, the external gear flow path 37b can be formed in, for example, a simple shape such as a linear hole, the friction loss (resistance) of the oil flowing through the external gear flow path 37b can be reduced, and oil can be stably supplied to the second bearing 32.

Further, in the embodiment, the internal gear 16, the external gear 23, the recess 27, the second bearing 32, and the convex part 25 are disposed to overlap each other when viewed from the second radial direction. That is, since the axis positions of the internal gear 16, the external gear 23, the recess 27, the second bearing 32 and the convex part 25 are the same as each other, it is possible to easily form the second oil supply path 37 penetrating the internal gear 16 and the external gear 23 and opening toward the second bearing 32 and to suppress the flow path length of the second oil supply path 37 to be short.

Further, in the embodiment, the second bearing 32 is disposed to overlap the internal gear 16 and the external gear 23 over the entire length of the axis direction when viewed from the second radial direction.

In this case, oil is easily supplied from the second oil supply path 37 to the entire area of the second bearing 32 in the axis direction and the performance of the second bearing 32 becomes more stable.

Additionally, the present invention is not limited to the above-described embodiment and, for example, as described below, the configuration can be changed in the scope not deviating from the spirit of the present invention.

The method of pressing the inner races 31a and 32a, the outer races 31b and 32b, and the spacers 31d and 32d of the first bearing 31 and the second bearing 32, that is, the fixing means is not limited to the configurations described in the above-described embodiment.

The shape of each of the first weight part 51 and the second weight part 52 is not limited to each shape described in the above-described embodiments.

In the above-described embodiment, an example in which each of the second fitting hole 23c and the female screw hole 23d is the retaining hole recessed from the surface 23e facing one side of the external gear 23 in the axis direction toward the other side in the axis direction has been described, but the present invention is not limited thereto. The second fitting hole 23c may be a through-hole penetrating the external gear 23 in the axis direction. The female screw hole 23d may be a through-hole penetrating the external gear 23 in the axis direction.

In the above-described embodiment, an example in which one set of the first fitting hole 22f, the second fitting hole 23c, and the pin member 34 is provided has been described, but the present invention is not limited thereto. For example, a plurality of sets of the first fitting hole 22f, the second fitting hole 23c, and the pin member 34 may be provided at intervals in the second circumferential direction.

In the above-described embodiment, an example in which the plate-shaped top wall portion 22b is the connection part connecting the external gear 23 and the ram shaft connection part 35 has been described, but the present invention is not limited thereto. That is, the connection part of the second rotation body 22 may have a shape other than the top wall portion 22b, that is, a columnar shape or a block shape other than the plate shape.

In the above-described embodiment, an example in which the fitting cylinder part 22d is fitted to the inner circumferential surface of the external gear 23 has been described, but the present invention is not limited thereto. The fitting cylinder part 22d may be fitted to the outer circumferential surface of the external gear 23. Even in this case, the same effect as described above can be obtained.

The present invention may combine the configurations described in the above-described embodiments, modifications, and the like as long as the gist of the present invention is not deviated and may add, omit, replace, and change the configurations in other forms. Further, the present invention is not limited by the above-described embodiments and the like, but is limited only by the claims.

According to the reciprocating linear motion mechanism for the can body maker and the can body maker of the present invention, it is possible to improve the production efficiency of the can. Further, it is possible to extend the life of parts of the bearing connecting the first rotation body and the second rotation body to be relatively rotatable. Further, it is possible to suppress the outer shape of the reciprocating linear motion mechanism to be small. Further, it is possible to reduce a manufacturing cost since the members are easily manufactured and obtain good workability such as assembly and maintenance. Further, it is possible to stably supply oil to the bearing connecting the first rotation body and the second rotation body. Thus, the present invention has industrial applicability.

EXPLANATION OF REFERENCES

1 Can body maker
2 Punch
3 Ram shaft
6 Cup holder
7 Through-hole
8 Die
9 End surface
10 Reciprocating linear motion mechanism
15 Housing
16 Internal gear
16a Internal teeth
21 First rotation body
21d Surface facing one side of first rotation body in axis direction
22 Second rotation body
22b Top wall portion (connection part)
22d Fitting cylinder part
22e Surface facing other side of second rotation body in axis direction
22f First fitting hole
22g Bolt insertion hole
23 External gear
23a External teeth
23c Second fitting hole
23d Female screw hole
23e Surface facing one side of external gear in axis direction
24 Bolt member
25 Convex part
27 Recess
31 First bearing
32 Second bearing (bearing)
34 Pin member
35 Ram shaft connection part
37 Second oil supply path (oil supply path)
37a Internal gear flow path
37b External gear flow path
C1 First center axis
C2 Second center axis

What is claimed is:

1. A reciprocating linear motion mechanism for a can body maker comprising:
   a housing including an internal gear centered on a first center axis;
   a first rotation body located inside the housing;
   a first bearing connecting the housing and the first rotation body to be relatively rotatable;
   a convex part protruding toward one side direction of an axis direction from a surface of the first rotation body facing toward the one side direction in the axis direction and centered on a second center axis parallel to the first center axis, the axis direction being a direction parallel to the first center axis;

a second rotation body including an external gear meshing with the internal gear about the second center axis and disposed toward the one side direction from the first rotation body in the axis direction;

a recess which is recessed toward the one side direction from a surface of the second rotation body facing toward another side direction in the axis direction and into which the convex part is inserted;

a second bearing connecting the convex part and the recess to be relatively rotatable; and a ram shaft connection part connected to the second rotation body and moved linearly in a reciprocating manner along a predetermined direction, wherein the internal gear, the external gear, the recess, the second bearing, and the convex part overlap each other when viewed from a radial direction orthogonal to the second center axis.

2. The reciprocating linear motion mechanism for the can body maker according to claim 1, wherein the second bearing overlaps the internal gear and the external gear over the entire length of the axis direction when viewed from the radial direction.

3. The reciprocating linear motion mechanism for the can body maker according to claim 1, wherein a part of the second bearing overlaps a part of the first bearing when viewed from the axis direction.

4. A can body maker comprising:

the reciprocating linear motion mechanism for the can body maker according to claim 1;

a ram shaft extending in the predetermined direction and of which one end portion is connected to the ram shaft connection part;

a punch disposed at the other end portion of the ram shaft;

a die including a through-hole into which the punch is inserted; and a cup holder pressed against an end surface to which the through-hole of the die opens.

5. A reciprocating linear motion mechanism for a can body maker comprising:

a housing including an internal gear centered on a first center axis;

a first rotation body located inside the housing;

a first bearing connecting the housing and the first rotation body to be relatively rotatable;

a convex part protruding toward one side direction of an axis direction from a surface of the first rotation body facing toward the one side direction in the axis direction and centered on a second center axis parallel to the first center axis, the axis direction being a direction parallel to the first center axis;

a second rotation body including an external gear meshing with the internal gear about the second center axis and disposed toward the one side direction from the first rotation body in the axis direction;

a recess which is recessed toward the one side direction from a surface of the second rotation body facing toward another side direction in the axis direction and into which the convex part is inserted; and a second bearing connecting the convex part and the recess to be relatively rotatable, wherein the internal gear, the external gear, the recess, the second bearing, and the convex part overlap each other when viewed from a radial direction orthogonal to the second center axis.

\* \* \* \* \*